United States Patent
Satake et al.

(10) Patent No.: US 12,544,994 B2
(45) Date of Patent: Feb. 10, 2026

(54) SUBSTRATE PROCESSING METHOD

(71) Applicant: EBARA CORPORATION, Tokyo (JP)

(72) Inventors: Masayuki Satake, Tokyo (JP);
Masayuki Nakanishi, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 90 days.

(21) Appl. No.: 18/686,939

(22) PCT Filed: Aug. 1, 2022

(86) PCT No.: PCT/JP2022/029464
§ 371 (c)(1),
(2) Date: Feb. 27, 2024

(87) PCT Pub. No.: WO2023/032552
PCT Pub. Date: Mar. 9, 2023

(65) Prior Publication Data
US 2025/0128483 A1   Apr. 24, 2025

(30) Foreign Application Priority Data

Sep. 1, 2021 (JP) .................................. 2021-142273
Jun. 29, 2022 (JP) .................................. 2022-104232

(51) Int. Cl.
*B29C 70/74* (2006.01)
*B29C 48/19* (2019.01)
(Continued)

(52) U.S. Cl.
CPC ............ *B29C 70/745* (2013.01); *B29C 48/19* (2019.02); *B29C 48/21* (2019.02); *B29L 2031/3406* (2013.01); *H10D 88/01* (2025.01)

(58) Field of Classification Search
CPC ... B29C 70/745; B29C 70/845; B29C 48/155; B29C 48/156
See application file for complete search history.

(56) References Cited

U.S. PATENT DOCUMENTS 5,073,324 A * 12/1991 Beaudet ................ B29C 70/845
                                                        264/262
8,119,500 B2    2/2012 Yang et al.
(Continued)

FOREIGN PATENT DOCUMENTS

CN    101295653 A    10/2008
CN    110854039 A    2/2020
(Continued)

OTHER PUBLICATIONS

International Search Report issued in Patent Application No. PCT/JP2022/029464 dated Aug. 30, 2022.

*Primary Examiner* — Edmund H Lee
(74) *Attorney, Agent, or Firm* — Chrisman Gallo Tochtrop LLC

(57) ABSTRACT

The present application relates to a substrate processing method of suppressing cracking and chipping of a laminated substrate manufactured by bonding substrates, and more particularly to a technique of applying filler to a gap formed between edge portions of the substrates constituting the laminated substrate. The substrate processing method includes: applying a first filler to the gap between an edge portion of a first substrate and an edge portion of a second substrate; and applying a second filler to the gap between the edge portion of the first substrate and the edge portion of the second substrate after applying of the first filler. A viscosity of the first filler is lower than a viscosity of the second filler.

18 Claims, 17 Drawing Sheets

(51) Int. Cl.
*B29C 48/21* (2019.01)
*B29L 31/34* (2006.01)
*H10D 88/00* (2025.01)

(56) References Cited

U.S. PATENT DOCUMENTS

| | | |
|---|---|---|
| 9,508,659 B2 | 11/2016 | Lu et al. |
| 11,444,061 B2 | 9/2022 | Okubo et al. |
| 2014/0242779 A1 | 8/2014 | Nakamura et al. |

FOREIGN PATENT DOCUMENTS

| | | | |
|---|---|---|---|
| DE | 19503510 | * | 8/1996 |
| FR | 2922363 | * | 4/2009 |
| JP | 2-202024 A | | 8/1990 |
| JP | 5-47617 A | | 2/1993 |
| JP | H05-304062 A | | 11/1993 |
| JP | H06204292 | * | 7/1994 |
| JP | H08195414 | * | 7/1996 |
| JP | 2014-167966 A | | 9/2014 |

* cited by examiner

SUBSTRATE PROCESSING METHOD

TECHNICAL FIELD

The present invention relates to a substrate processing method of suppressing cracking and chipping of a laminated substrate manufactured by bonding substrates, and more particularly to a technique of applying filler to a gap formed between edge portions of the substrates constituting the laminated substrate.

BACKGROUND ART

In recent years, in order to achieve higher density and higher functionality in semiconductor devices, three-dimensional packaging technology, in which substrates are laminated and integrated three-dimensionally, has been developed. For example, in the three-dimensional packaging technology, a device surface of a first substrate on which integrated circuits and electrical wires are formed is bonded to a device surface of a second substrate on which integrated circuits and electrical wires are formed. After the first substrate is bonded to the second substrate, the second substrate is thinned by a polishing apparatus or a grinding apparatus. In this manner, integrated circuits can be stacked in a direction perpendicular to the device surfaces of the first substrate and the second substrate.

In the three-dimensional packaging technology, three or more substrates may be bonded to each other. For example, a third substrate may be bonded to the second substrate after the second substrate bonded to the first substrate has been thinned, and then the third substrate may be thinned. In this specification, a substrate in a form of substrates bonded to each other may be referred to as a "laminated substrate".

Generally, an edge portion of a substrate is polished in advance in a rounded shape or a beveled shape in order to prevent cracking or chipping of the edge portion. When the second substrate having such a shape is grinded, an acute edge is formed in the second substrate as a result of grinding. This acute edge (hereinafter referred to as a knife-edge portion) is constituted by a grinded back surface and a circumferential surface of the second substrate. Such a knife-edge portion is likely to be chipped by a physical contact, and the laminated substrate itself may be broken during transportation of the laminated substrate. Furthermore, insufficient bonding between the first substrate and the second substrate may cause the second substrate to be cracked during grinding.

Thus, a filler is applied to the edge portion of the laminated substrate before the second substrate is grinded in order to prevent the knife-edge portion from cracking or chipping. The filler is applied to a gap between an edge portion of the first substrate and an edge portion of the second substrate. The filler can support the knife-edge portion that has been formed after the second substrate is grinded, and can prevent cracking or chipping of the knife-edge portion.

CITATION LIST

Patent Literature

Patent document 1: Japanese laid-open patent publication No. H05-304062

SUMMARY OF INVENTION

Technical Problem

However, when the filler is applied to the gap between the edge portion of the first substrate and the edge portion of the second substrate, the filler may not enter a minute gap, particularly near a bonding surface of the laminated substrate. Furthermore, the filler that has been applied to the laminated substrate may be dissolved by a processing liquid for use in post-processing, such as polishing or cleaning. If the filler is dissolved, the laminated substrate may be damaged in the post-processing, and as a result, the laminated substrate or a process performance may be adversely affected.

It is therefore an object of the present invention to provide a substrate processing method capable of reliably filling a gap between an edge portion of a first substrate and an edge portion of a second substrate with filler in a short period of time, and capable of appropriately protecting an edge portion of a laminated substrate without causing any adverse effects in post-processing.

Solution to Problem

In an embodiment, there is provided a substrate processing method of applying a filler to a laminated substrate having a first substrate and a second substrate bonded to each other, comprising: applying a first filler to a gap between an edge portion of the first substrate and an edge portion of the second substrate; and applying a second filler to the gap after applying of the first filler, a viscosity of the first filler being lower than a viscosity of the second filler.

In an embodiment, the substrate processing method further comprises curing the first filler after applying of the first filler, wherein applying of the second filler is performed after curing of the first filler.

In an embodiment, the first filler contains particles, and a diameter of each of the particles is 1 μm or less.

In an embodiment, the second filler contains particles, and a diameter of each of the particles contained in the second filler is larger than the diameter of each of the particles contained in the first filler.

In an embodiment, the first filler does not contain particles.

In an embodiment, the viscosity of the first filler is 5 Pa·s or less.

In an embodiment, a radial width of the applied first filler is smaller than a radial width of the applied second filler.

In an embodiment, the substrate processing method further comprises applying a third filler to the gap after applying of the second filler; and post-processing for the laminated substrate after applying of the third filler, wherein the third filler has chemical resistance that does not allow the third filler to be dissolved by a processing liquid for use in the post-processing.

In an embodiment, the substrate processing method further comprises applying a third filler to the gap after applying of the second filler, a viscosity of the third filler being higher than the viscosity of the second filler.

In an embodiment, the substrate processing method further comprises curing the second filler after applying of the second filler, wherein applying of the third filler is performed after curing of the second filler.

In an embodiment, a radial width of the applied second filler is larger than a radial width of the applied third filler.

In an embodiment, there is provided a substrate processing method of applying a filler to a laminated substrate having a first substrate and a second substrate bonded to each other, comprising: applying a first filler to a gap between an edge portion of the first substrate and an edge portion of the second substrate; applying a second filler to the gap after applying of the first filler; and post-processing for the laminated substrate after applying of the second filler, wherein the second filler has chemical resistance that does not allow the second filler to be dissolved by a processing liquid for use in the post-processing.

In an embodiment, the substrate processing method further comprises curing the first filler after applying of the first filler, wherein applying of the second filler is performed after curing of the first filler.

In an embodiment, the first filler contains particles, and a diameter of each of the particles is 1 μm or less.

In an embodiment, the first filler does not contain particles.

In an embodiment, applying of the first filler and applying of the second filler are performed while the laminated substrate held in a vertical posture is rotated.

In an embodiment, applying of the third filler is performed while the laminated substrate held in a vertical posture is rotated.

Advantageous Effects of Invention

According to the present invention, the fillers having different viscosities and different diameters of the particles contained in the fillers are applied in the form of multi layers to the gap between the edge portion of the first substrate and the edge portion of the second substrate. Therefore, the filler can reliably fill the gap in a short period of time. Furthermore, the edge portion of the laminated substrate can be appropriately protected without any adverse effects in post-processing by applying a filler having chemical resistance that is not dissolved by the processing liquid for use in the post-processing.

DESCRIPTION OF EMBODIMENTS

Hereinafter, embodiments of the present invention will be described in detail with reference to the drawings.

Figure 1A:
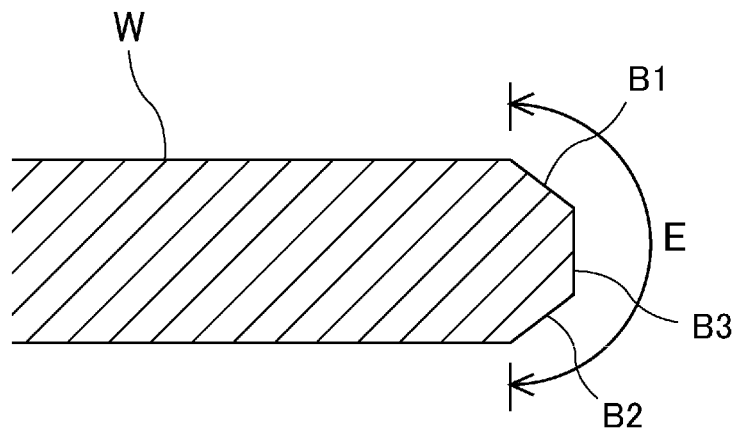
FIG. 1A is an enlarged cross-sectional view showing an edge portion of a substrate.
Figure 1B:
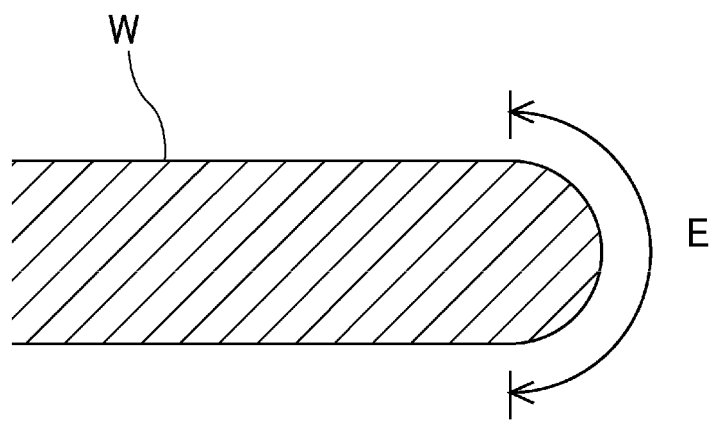
FIG. 1B is an enlarged cross-sectional view showing an edge portion of a substrate.

FIGS. 1A and 1B are enlarged cross-sectional views each showing an edge portion E of a substrate W. More specifically, FIG. 1A is a cross-sectional view of a substrate W of a so-called straight type, and FIG. 1B is a cross-sectional view of a substrate W of a so-called round type. The edge portion E is a portion constituting an outermost circumferential surface inclined with respect to a flat surface (a front surface and a back surface) of the substrate W and having a rounded shape or a beveled shape.

In the substrate W in FIG. 1A, the edge portion E is an outermost circumferential surface including an upper slope portion (or upper bevel portion) B1, a lower slope portion (or lower bevel portion) B2, and a side portion (or apex) B3 of the substrate W. In the substrate W in FIG. 1B, the edge portion E is a portion constituting an outermost circumferential surface of the substrate W and having a curved cross section. The edge portion E may be also referred to as a bevel portion.

Figure 2:
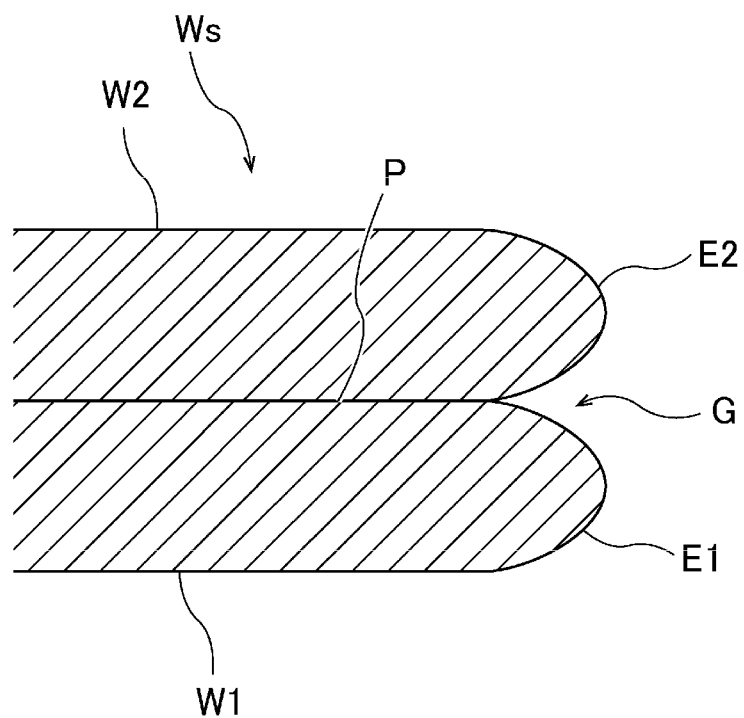
FIG. 2 is an enlarged cross-sectional view showing an edge portion of a laminated substrate.

FIG. 2 is an enlarged cross-sectional view showing a laminated substrate Ws. The laminated substrate Ws has a structure in which a first substrate W1 and a second substrate W2 are bonded at a bonding surface P. Each of the first substrate W1 and the second substrate W2 for use in this embodiment has a circular shape. The laminated substrate Ws of this embodiment has a structure in which a first substrate W1 and a second substrate W2 of the round type shown in FIG. 1B are bonded, while in one embodiment, the laminated substrate Ws may have a structure in which a first substrate W1 and a second substrate W2 of the straight type shown in FIG. 1A are bonded. In this specification, the edge portion of the laminated substrate Ws refers to an outer periphery of the laminated substrate Ws including the edge portion E1 of the first substrate W1 and the edge portion E2 of the second substrate W2. The edge portions E1 and E2 may be called bevel portions. A gap G is formed between the edge portion E1 of the first substrate W1 and the edge portion E2 of the second substrate W2. The gap G is formed around the entire circumference of the laminated substrate Ws.

Figure 3:
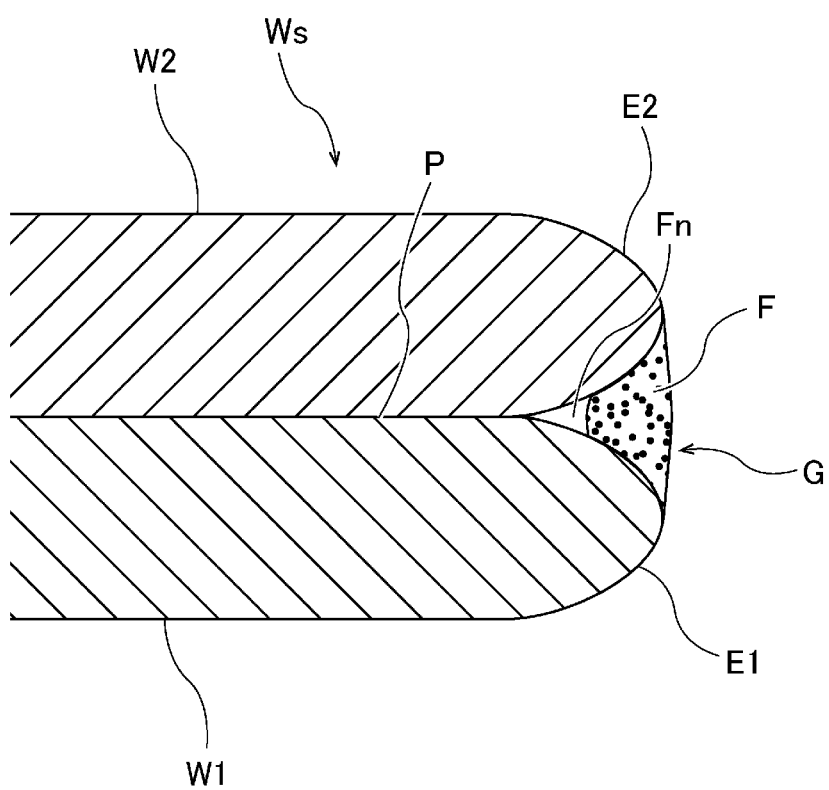
FIG. 3 is an enlarged cross-sectional view showing the edge portion of the laminated substrate in which a filler is not applied to a minute gap.

A filler to be applied to the gap G between the edge portion E1 of the first substrate W1 and the edge portion E2 of the second substrate W2 is mainly composed of a binder, a solvent, and particles. The particles are dispersed in the binder dissolved in the solvent. The particles are used in order to increase a volume of the filler and to adjust a viscosity of the filler. The gap G between the edge portion E1 of the first substrate W1 and the edge portion E2 of the second substrate W2 is minute, particularly near the bonding surface P of the laminated substrate Ws. FIG. 3 is an enlarged cross-sectional view showing the edge portion of the laminated substrate Ws in which a filler F does not fill a minute inner end of the gap G. If a viscosity of the filler F is high, the filler F will not enter the minute inner end of the gap G, and as a result, a region Fn which is not filled with the filler F may be created.

Thus, in this embodiment, fillers having different viscosities in a form of multi layers are applied, so that the fillers can reliably fill the minute gap G between the edge portion E1 of the first substrate W1 and the edge portion E2 of the second substrate W2.

Figure 4:
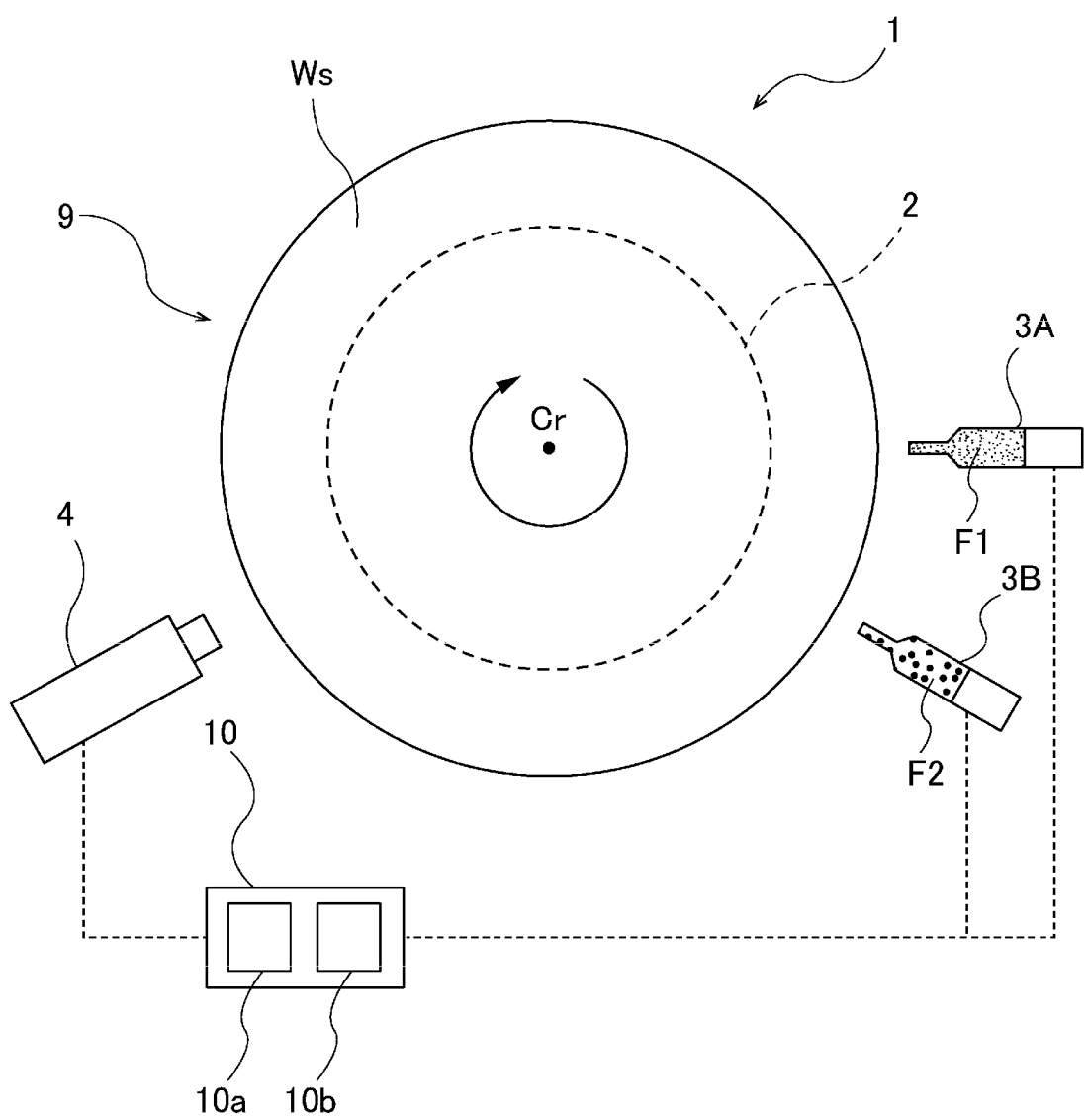
FIG. 4 is a plan view showing an embodiment of a substrate processing apparatus.
Figure 5:
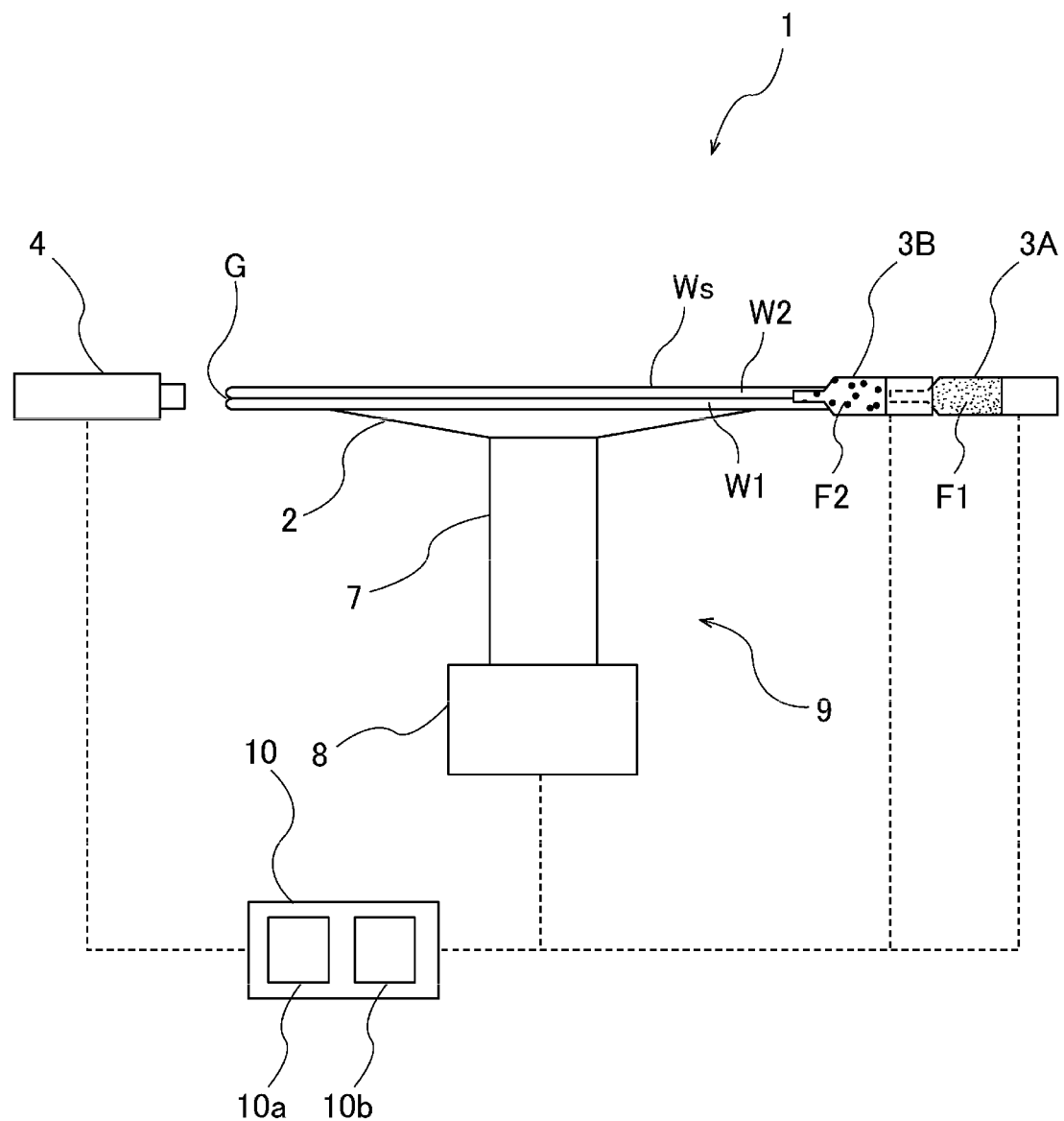
FIG. 5 is a side view showing an embodiment of the substrate processing apparatus.

FIG. 4 is a plan view showing an embodiment of a substrate processing apparatus 1, and FIG. 5 is a side view showing an embodiment of the substrate processing apparatus 1. The substrate processing apparatus 1 is an apparatus for filling a laminated substrate Ws with a first filler F1 and a second filler F2. The laminated substrate Ws has a first substrate W1 and a second substrate W2 which have been bonded. The substrate processing apparatus 1 includes a filler application module 9 configured to apply the first filler F1 and the second filler F2 to the laminated substrate Ws, and an operation controller 10 configured to control operations of the filler application module 9. The filler application module 9 includes a substrate holder 2 configured to hold the laminated substrate Ws, a first application device 3A configured to apply the first filler F1, a second application device 3B configured to apply the second filler F2, and a curing device 4 configured to cure the applied first filler F1 and the applied second filler F2.

The substrate holder 2 includes a stage configured to hold a back surface of the laminated substrate Ws by vacuum suction. The filler application module 9 further includes a rotating shaft 7 coupled to a central portion of the substrate holder 2, and a rotating mechanism 8 configured to rotate the substrate holder 2 and the rotating shaft 7. The laminated substrate Ws is placed on the substrate holder 2 such that the center of the laminated substrate Ws is aligned with a central axis of the rotating shaft 7. The rotating mechanism 8 includes a motor (not shown). As shown in FIG. 4, the rotating mechanism 8 is configured to rotate the substrate holder 2 and the laminated substrate Ws together in a direction shown by an arrow about a central axis Cr of the laminated substrate Ws.

The first application device 3A is located radially outwardly of the laminated substrate Ws placed on the substrate holder 2, and is configured to apply the first filler F1 to the gap G between the edge portion E1 of the first substrate W1 and the edge portion E2 of the second substrate W2 of the laminated substrate Ws. The second application device 3B is located radially outwardly of the laminated substrate Ws placed on the substrate holder 2, and is configured to apply the second filler F2 to the gap G between the edge portion E1 of the first substrate W1 and the edge portion E2 of the second substrate W2 of the laminated substrate Ws. In this embodiment, the first application device 3A is arranged upstream of the second application device 3B in a rotating direction of the laminated substrate Ws, while in one embodiment, the first application device 3A may be arranged downstream of the second application device 3B in the rotating direction of the laminated substrate Ws.

Figure 6:
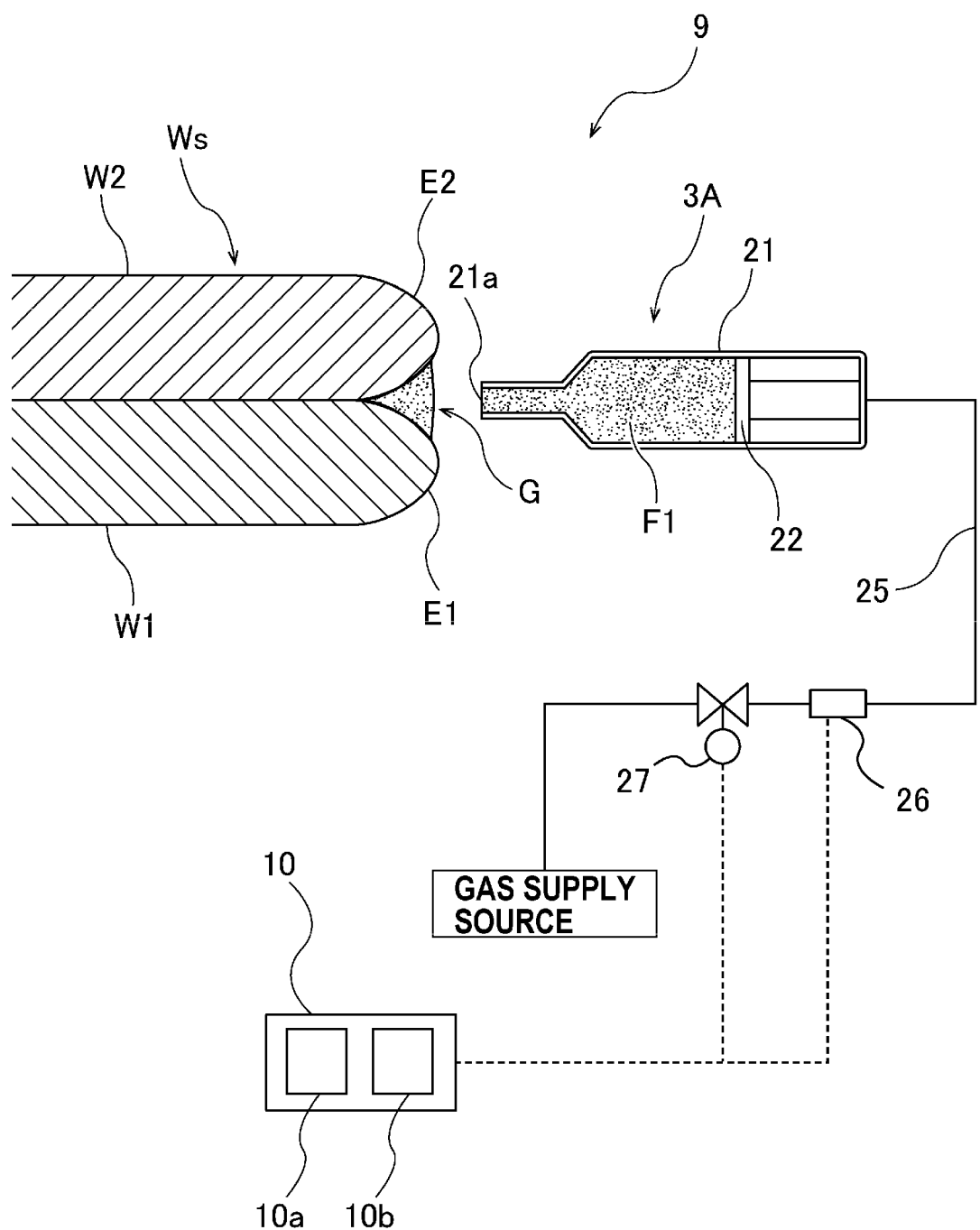
FIG. 6 is a schematic diagram showing an embodiment of an application device.

FIG. 6 is a schematic diagram showing an embodiment of an application device. In FIG. 6, a configuration of the first application device 3A will be described. The first application device 3A includes a syringe 21 for injecting the first filler F1, a piston 22 movable reciprocally in the syringe 21, and a horizontal moving mechanism (not shown) configured to move the syringe 21 toward and away from the laminated substrate Ws. A distance between the laminated substrate Ws and a filler emitting port 21a of the first application device 3A can be adjusted by the horizontal moving mechanism. In one embodiment, the horizontal moving mechanism may be omitted. In this case, the distance between the laminated substrate Ws and the filler emitting port 21a is determined in advance such that the first filler F1 is appropriately injected into the gap G of the laminated substrate Ws.

The syringe 21 has a hollow structure and is configured to be filled with the first filler F1 therein. The piston 22 is arranged in the syringe 21. The syringe 21 has the filler emitting port 21a for emitting the first filler F1 at its tip. The tip of the syringe 21 including the filler emitting port 21a may be configured to be detachable. A shape of the filler emitting port 21a is selected to be an appropriate shape depending on physical properties (e.g., viscosity, etc.) of the first filler F1 to be applied. The filler emitting port 21a is arranged so as to face the gap G between the edge portion E1 of the first substrate W1 and the edge portion E2 of the second substrate W2.

The first application device 3A is coupled to a gas supply source via a gas supply line 25. When gas (e.g., dry air or nitrogen gas) is supplied from the gas supply source into the syringe 21, the piston 22 moves forward in the syringe 21. The forward movement of the piston 22 causes the first filler F1 in the syringe 21 to be emitted through the filler emitting port 21a.

A pressure regulator 26 and an on-off valve 27 are disposed in the gas supply line 25. The on-off valve 27 is an actuator-driven valve, such as an electric valve or a solenoid valve. When the on-off valve 27 is opened, the gas is supplied from the gas supply source to the first application device 3A, so that the first application device 3A applies the first filler F1 to the laminated substrate Ws. When the on-off valve 27 is closed, the supply of the gas to the first application device 3A is stopped, so that the applying of the first filler F1 is stopped. The pressure regulator 26 can regulate an amount of the first filler F1 to be emitted from the filler emitting port 21a per unit time by regulating a pressure of the gas to be supplied from the gas supply source to the first application device 3A. Operations of the pressure regulator 26 and the on-off valve 27 are controlled by the operation controller 10.

The configuration of the first application device 3A has been described with reference to FIG. 6. The second application device 3B also has the same configuration as the first application device 3A, and duplicated descriptions will be omitted. The second application device 3B has a syringe 21 filled with the second filler F2 therein, and is configured to apply the second filler F2 to the laminated substrate Ws. Operations of the second application device 3B are controlled by the operation controller 10. In one embodiment, the second application device 3B may be coupled to the same gas supply source coupled to the first application device 3A. In this case, the gas supply source may be coupled to both the gas supply line 25 of the first application device 3A and a gas supply line 25 of the second application device 3B.

In one embodiment, the first application device 3A and the second application device 3B may each include a screw feeder instead of the combination of the syringe 21 and the piston 22.

As shown in FIGS. 4 and 5, the curing device 4 is located radially outwardly of the laminated substrate Ws placed on the substrate holder 2. The curing device 4 is disposed downstream of the first application device 3A and the second application device 3B in the rotating direction of the laminated substrate Ws, and is configured to cure the first filler F1 and the second filler F2 that have been applied to the laminated substrate Ws by the first application device 3A and the second application device 3B. Curing of the first filler F1 and the second filler F2 by the curing device 4 is performed while the laminated substrate Ws is rotated. In this embodiment, the first filler F1 and the second filler F2 have thermosetting property. An example of such filler is a thermosetting resin.

The curing device 4 is an air heater, which is configured to emit hot air blowing toward the first filler F1 and the second filler F2 applied to the laminated substrate Ws. The curing device 4 is configured to be able to regulate pressure and temperature of the hot air blowing toward the first filler F1 and the second filler F2. The first filler F1 and the second filler F2 heated with the hot air are cured by a crosslinking reaction. When the first filler F1 and the second filler F2 contain a solvent, the solvent is volatilized by being heated. The curing device 4 is not limited to the air heater, and may be a lamp heater or other configuration as long as the curing device 4 can heat and cure the first filler F1 and the second filler F2.

In this embodiment, the first filler F1 and the second filler F2 have thermosetting property, while in one embodiment, the first filler F1 and the second filler F2 may have ultraviolet curable property. In this case, the curing device 4 may be a UV irradiation device configured to cure the first filler F1 and the second filler F2 by emitting ultraviolet ray. When the first filler F1 and the second filler F2 contain a solvent, the curing device 4 may heat the first filler F1 and the second filler F2 to volatilize the solvent with an air heater or the like, in addition to the UV irradiation device.

Operations of the filler application module 9 including the first application device 3A, the second application device 3B, the curing device 4, the rotating mechanism 8, the pressure regulator 26, and the on-off valve 27 are controlled by the operation controller 10. The operation controller 10 is composed of at least one computer. The operation controller 10 includes a memory 10a storing programs therein for controlling the operations of the filler application module 9, and a processor 10b configured to perform arithmetic operations according to instructions contained in the programs. The memory 10a includes a main memory, such as a random-access memory (RAM), and an auxiliary memory, such as a hard disk drive (HDD) or a solid state drive (SSD). Examples of the processor 10b include a CPU (central processing unit) and a GPU (graphic processing unit). However, the specific configuration of the operation controller 10 is not limited to these examples.

Figure 7:
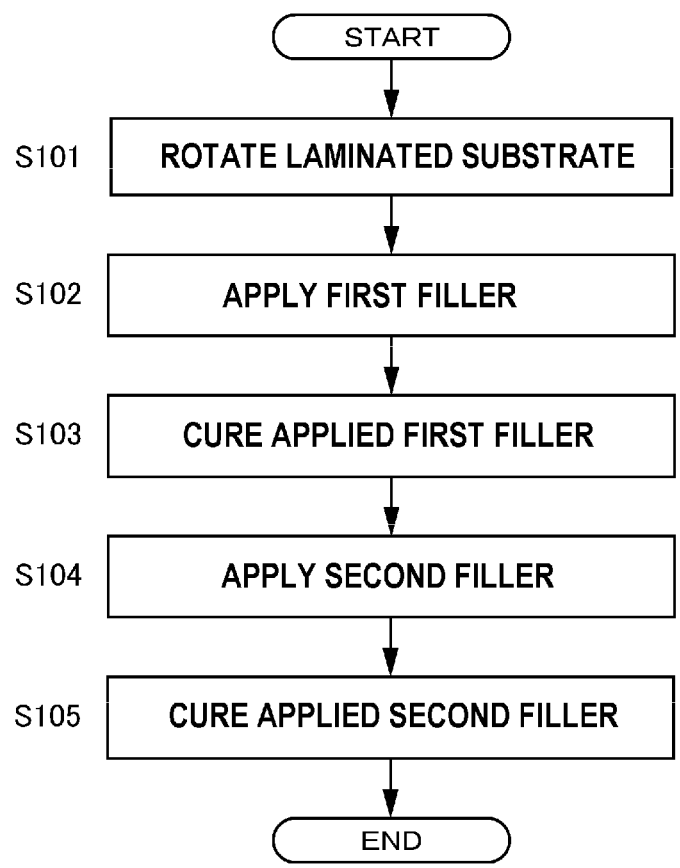
FIG. 7 is a flowchart showing an embodiment of a substrate processing method.

FIG. 7 is a flowchart showing an embodiment of a substrate processing method.

In step S101, the operation controller 10 instructs the rotating mechanism 8 of the filler application module 9 to rotate the substrate holder 2 and the laminated substrate Ws at a predetermined rotation speed.

In step S102, the operation controller 10 instructs the on-off valve 27 coupled to the first application device 3A to open to cause the gas to be supplied from the gas supply source to the first application device 3A. With this operation, the first filler F1 is injected into the gap G between the edge portion E1 of the first substrate W1 and the edge portion E2 of the second substrate W2 of the rotating laminated substrate Ws. After the first filler F1 is applied to the laminated substrate Ws, the syringe 21 of the first application device 3A may be moved away from the laminated substrate Ws.

In step S103, the operation controller 10 instructs the curing device 4 of the filler application module 9 to heat the laminated substrate Ws to cure the applied first filler F1.

In step S104, the operation controller 10 instructs an on-off valve 27 coupled to the second application device 3B to open to cause the gas to be supplied from the gas supply source to the second application device 3B. With this operation, the second filler F2 is injected into the gap G between the edge portion E1 of the first substrate W1 and the edge portion E2 of the second substrate W2 of the rotating laminated substrate Ws. The second filler F2 is applied so as to lay on the cured first filler F1. After the second filler F2 is applied to the laminated substrate Ws, the syringe 21 of the second application device 3B may be moved away from the laminated substrate Ws.

In step S105, the operation controller 10 instructs the curing device 4 of the filler application module 9 to heat the laminated substrate Ws to cure the applied second filler F2.

Figure 8:
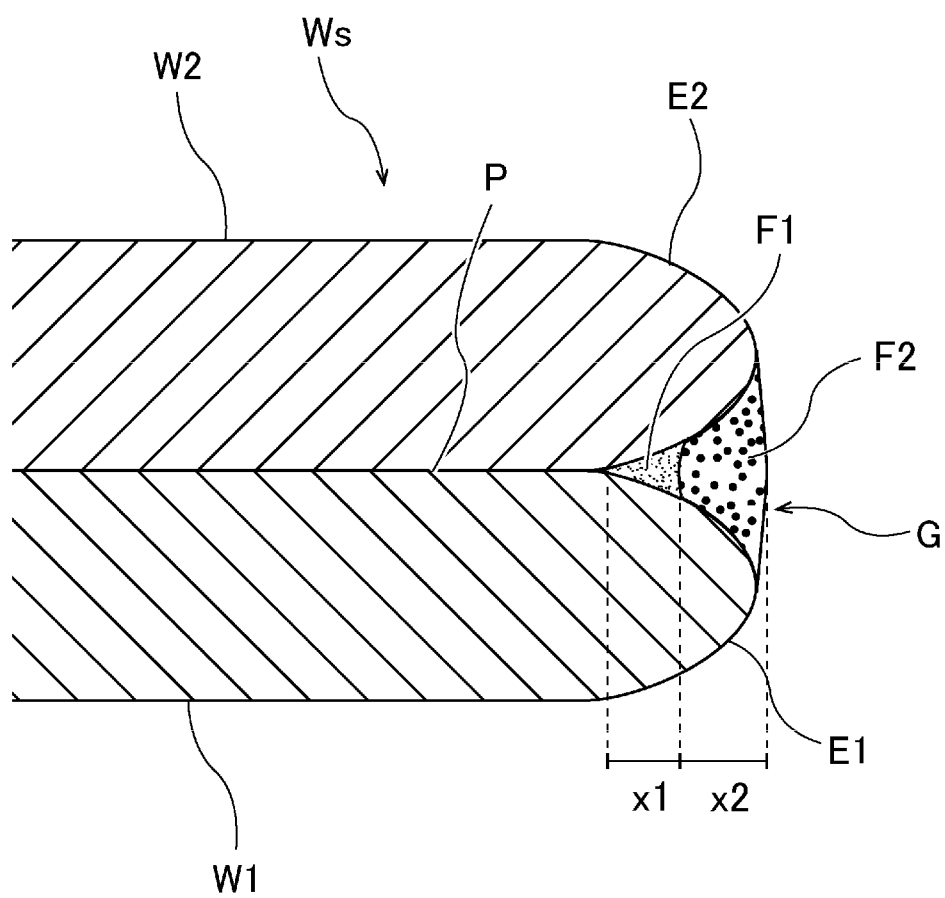
FIG. 8 is an enlarged cross-sectional view showing the edge portion of the laminated substrate filled with a first filler and a second filler.

FIG. 8 is an enlarged cross-sectional view showing the laminated substrate Ws filled with the first filler F1 and the second filler F2. The second filler F2 is located radially outwardly of the first filler F1, and is applied so as to cover the first filler F1. The first filler F1 and the second filler F2 are each composed of a binder, a solvent, and particles. The particles are dispersed in the binder dissolved in the solvent.

Examples of the binder include inorganic binder containing alkali metal silicate, organic binder made of silicone resin or epoxy resin, and the like. The binder may contain a solvent. An example of particles is inorganic particles, such as silica or alumina.

A viscosity of the first filler F1 is lower than a viscosity of the second filler F2. The gap G between the edge portion E1 of the first substrate W1 and the edge portion E2 of the second substrate W2 is minute, particularly near the bonding surface P of the laminated substrate Ws. A filler having a low viscosity easily enters the minute gap, so that the first filler F1 may have a low viscosity of 5 Pa·s or less. The viscosities of the first filler F1 and the second filler F2 are each adjusted by an amount of the solvent, an amount of the particles, diameters of the particles, etc. In one embodiment, the first filler F1 may not contain the particles.

A radial width x1 of the applied first filler F1 is smaller than a radial width x2 of the applied second filler F2. In one embodiment, a volume of the applied first filler F1 is smaller than a volume of the applied second filler F2. A filler having a low viscosity contains a large amount of the solvent, so that a volume of such filler that is finally filled decreases after the filler is cured. Therefore, when fillers of the same volume are filled, a filler having a low viscosity requires a larger amount of the filler to be applied than a filler having a high viscosity. In addition, a large amount of the solvent should be volatilized. Therefore, when fillers of the same volume are filled, a filler having a low viscosity requires a longer time for applying and curing than a filler having a high viscosity. In this embodiment, the fillers can be filled in a short period of time by applying the second filler F2, which has a higher viscosity than the first filler F1, in a larger volume than a volume of the first filler F1.

A thickness of the applied first filler F1 (a dimension along a thickness direction of the laminated substrate Ws)

may be 10 μm or less. In one example, diameters of the particles contained in the first filler F1 are 1 μm or less. As a result, the first filler F1 fills even a region near the bonding surface P with no void. Diameters of the particles contained in the second filler F2 are larger than the diameters of the particles contained in the first filler F1. The particles having the large diameters can efficiently increase the volume of the second filler F2, and can increase a mechanical strength of the second filler F2.

In one embodiment, the first filler F1 and/or the second filler F2 may not contain the particles.

Next, another embodiment of the substrate processing method will be described. The laminated substrate Ws filled with the first filler F1 and the second filler F2 is processed in post-processing, such as a polishing process (e.g., chemical mechanical polishing) and a cleaning process. The polishing process is a process of polishing a surface of the laminated substrate Ws by bringing the laminated substrate Ws into sliding contact with a polishing surface while supplying a polishing liquid onto the polishing surface. The cleaning process is a process of supplying a cleaning liquid to the polished laminated substrate Ws to clean the surface of the laminated substrate Ws.

In the post-processing, processing liquids, such as an alkaline polishing liquid and an acidic cleaning liquid, are used. The second filler F2 is located at an outermost portion of the gap G of the laminated substrate Ws, and therefore, the second filler F2 may be dissolved by the processing liquids for use in the post-processing. If the second filler F2 is dissolved, the laminated substrate Ws may be damaged, and as a result, the laminated substrate or a process performance may be adversely affected.

Thus, in this embodiment, a filler having chemical resistance that is not dissolved by the processing liquid for use in the post-processing is further applied to the radially-outermost layer of the laminated substrate Ws, so that the laminated substrate Ws can be effectively protected.

Figure 9:
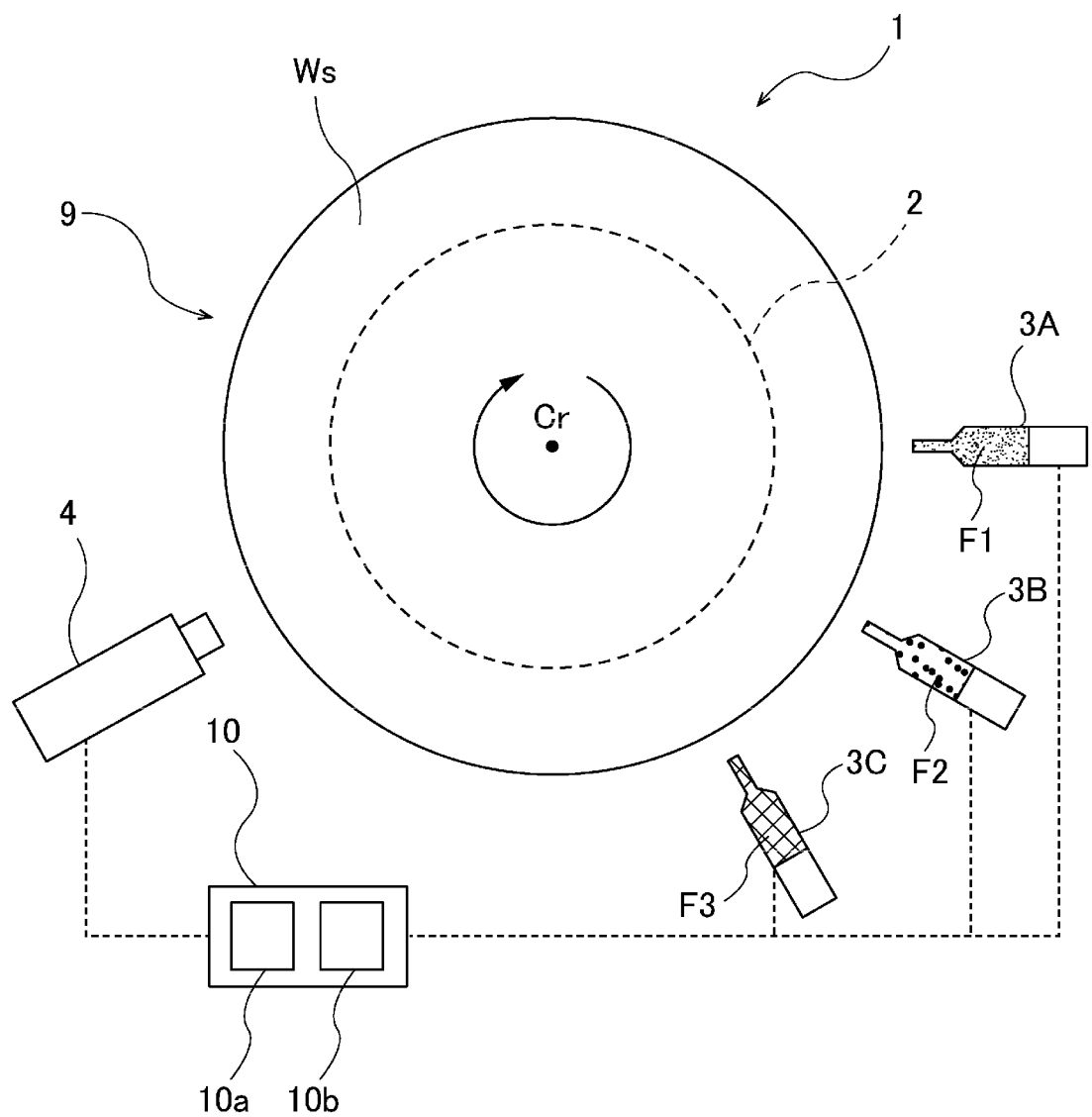
FIG. 9 is a plan view showing another embodiment of the substrate processing apparatus.

FIG. 9 is a plan view showing another embodiment of the substrate processing apparatus 1. Configurations of the substrate processing apparatus 1 of this embodiment, which will be not particularly described, are the same as the configurations of the substrate processing apparatus 1 of the above-described embodiment described with reference to FIGS. 4 and 5, and duplicated descriptions will be omitted. In this embodiment, the filler application module 9 further includes a third application device 3C configured to apply a third filler F3 to the laminated substrate Ws.

The third application device 3C is located radially outwardly of the laminated substrate Ws placed on the substrate holder 2, and is configured to apply the third filler F3 to gap G between the edge portion E1 of the first substrate W1 and the edge portion E2 of the second substrate W2 of the laminated substrate Ws. In this embodiment, the third application device 3C is arranged downstream of the first application device 3A and the second application device 3B in the rotating direction of the laminated substrate Ws, while a positional relationship between the first application device 3A, the second application device 3B, and the third application device 3C is not limited to this embodiment. In one embodiment, the third application device 3C may be arranged upstream of the first application device 3A and the second application device 3B in the rotating direction of the laminated substrate Ws.

A configuration of the third application device 3C is the same as that of the first application device 3A described with reference to FIG. 6, and duplicated descriptions will be omitted. The third application device 3C has a syringe 21 filled with the third filler F3 therein, and is configured to apply the third filler F3 to the laminated substrate Ws. Operations of the third application device 3C are controlled by the operation controller 10. In one embodiment, the third application device 3C may be coupled to the same gas supply source coupled to the first application device 3A. In this case, the gas supply source may be coupled to both the gas supply line 25 of the first application device 3A and a gas supply line 25 of the third application device 3C.

In one embodiment, the first application device 3A, the second application device 3B, and the third application device 3C may each include a screw feeder instead of the combination of the syringe 21 and the piston 22.

Figure 10:
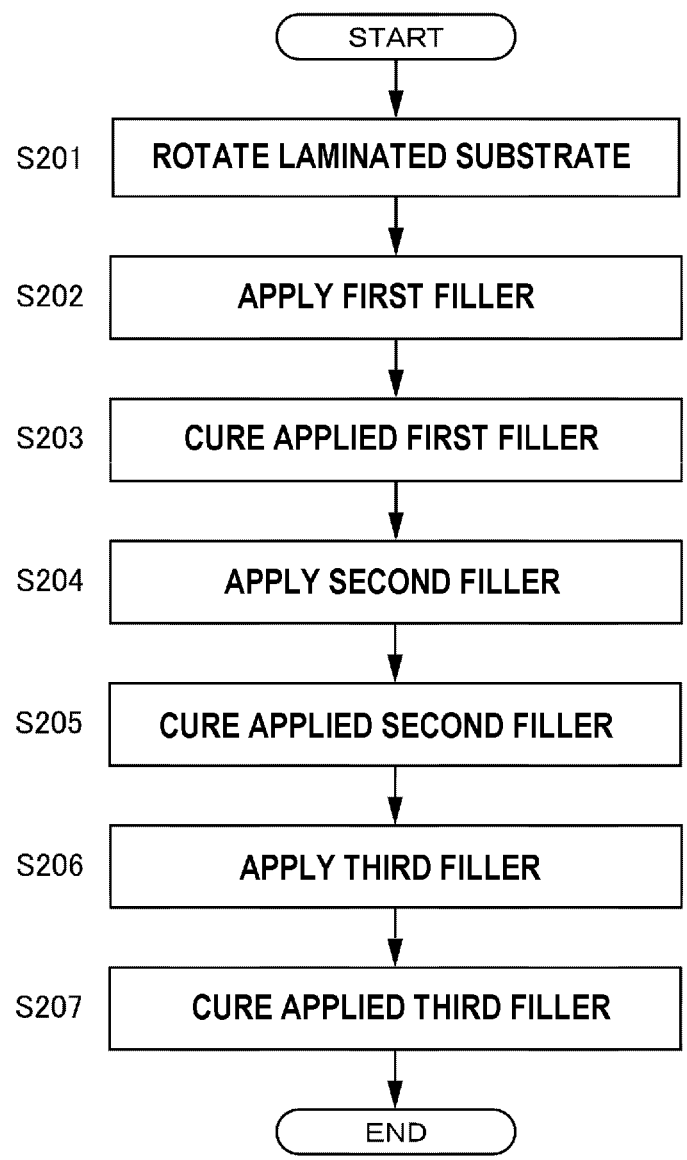
FIG. 10 is a flowchart showing another embodiment of the substrate processing method.

FIG. 10 is a flowchart showing another embodiment of the substrate processing method.

In step S201, the operation controller 10 instructs the rotating mechanism 8 of the filler application module 9 to rotate the substrate holder 2 and the laminated substrate Ws at a predetermined rotation speed.

In step S202, the operation controller 10 instructs the on-off valve 27 coupled to the first application device 3A to open to cause the gas to be supplied from the gas supply source to the first application device 3A. With this operation, the first filler F1 is injected into the gap G between the edge portion E1 of the first substrate W1 and the edge portion E2 of the second substrate W2 of the rotating laminated substrate Ws. After the first filler F1 is applied to the laminated substrate Ws, the syringe 21 of the first application device 3A may be moved away from the laminated substrate Ws.

In step S203, the operation controller 10 instructs the curing device 4 of the filler application module 9 to heat the laminated substrate Ws to cure the applied first filler F1.

In step S204, the operation controller 10 instructs the on-off valve 27 coupled to the second application device 3B to open to cause the gas to be supplied from the gas supply source to the second application device 3B. With this operation, the second filler F2 is injected into the gap G between the edge portion E1 of the first substrate W1 and the edge portion E2 of the second substrate W2 of the rotating laminated substrate Ws. The second filler F2 is applied so as to lay on the cured first filler F1. After the second filler F2 is applied to the laminated substrate Ws, the syringe 21 of the second application device 3B may be moved away from the laminated substrate Ws.

In step S205, the operation controller 10 instructs the curing device 4 of the filler application module 9 to heat the laminated substrate Ws to cure the applied second filler F2.

In step S206, the operation controller 10 instructs an on-off valve 27 coupled to the third application device 3C to open to cause the gas to be supplied from the gas supply source to the third application device 3C. With this operation, the third filler F3 is injected into the gap G between the edge portion E1 of the first substrate W1 and the edge portion E2 of the second substrate W2 of the rotating laminated substrate Ws. The third filler F3 is applied so as to lay on the cured second filler F2. After the third filler F3 is applied to the laminated substrate Ws, the syringe 21 of the third application device 3C may be moved away from the laminated substrate Ws.

In step S207, the operation controller 10 instructs the curing device 4 of the filler application module 9 to heat the laminated substrate Ws to cure the applied third filler F3.

Figure 11:
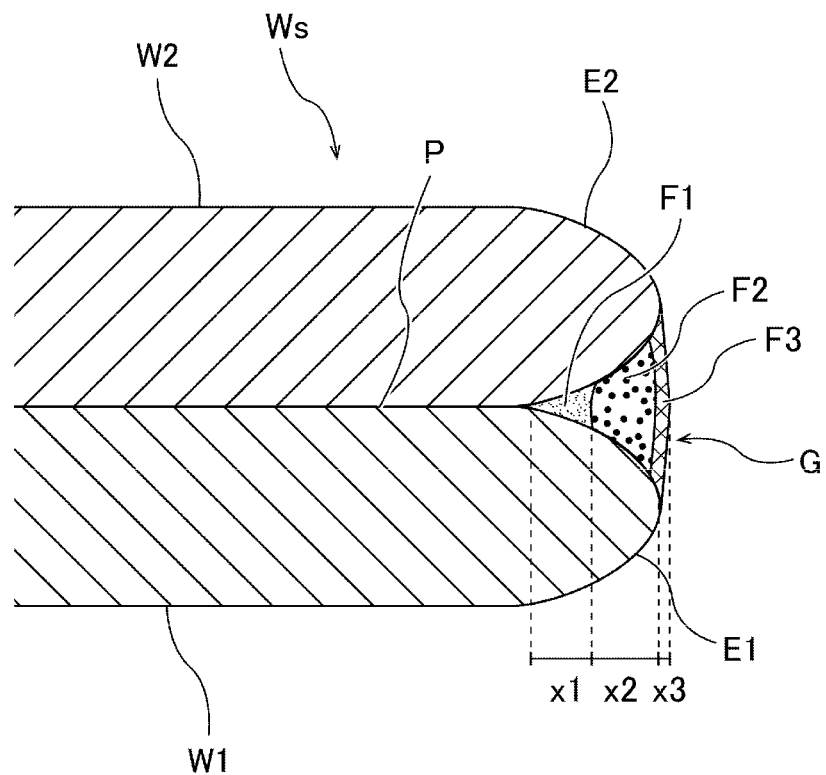
FIG. 11 is an enlarged cross-sectional view showing the edge portion of the laminated substrate filled with the first filler, the second filler, and a third filler.

FIG. 11 is an enlarged cross-sectional view showing the laminated substrate Ws filled with the first filler F1, the second filler F2, and the third filler F3. The second filler F2 is located radially outwardly of the first filler F1, and is applied so as to cover the first filler F1. The third filler F3 is located radially outwardly of the second filler F2, and is applied so as to cover the second filler F2. The first filler F1 and the second filler F2 are the same as those in the embodiment described with reference to FIG. 8, and duplicated descriptions will be omitted. The third filler F3 is composed of a binder, a solvent, and particles. The particles are dispersed in the binder dissolved in the solvent. In one embodiment, the third filler F3 may not contain the particles.

Examples of the binder include inorganic binder containing alkali metal silicate, organic binder made of silicone resin or epoxy resin, and the like. The binder may contain a solvent. An example of particles is inorganic particles, such as silica or alumina.

The third filler F3 has chemical resistance that does not allow the third filler F3 to be dissolved by the processing liquid for use in the post-processing. Here, "not dissolved" not only mean that the third filler F3 is not dissolved at all, but also includes that the third filler F3 does not substantially collapse.

A radial width x1 of the applied first filler F1 is smaller than a radial width x2 of the applied second filler F2. In one embodiment, a volume of the applied first filler F1 is smaller than a volume of the applied second filler F2. A filler having a low viscosity contains a large amount of the solvent, so that a volume of such filler that is finally filled decreases after the filler is cured. Therefore, when fillers of the same volume are filled, a filler having a low viscosity requires a larger amount of the filler to be applied than a filler having a high viscosity. In addition, a large amount of solvent should be volatilized. Therefore, when fillers of the same volume are filled, a filler having a low viscosity requires a longer time for applying and curing than a filler having a high viscosity. In this embodiment, the fillers can be filled in a short period of time by applying the second filler F2, which has a higher viscosity than the first filler F1, in a larger volume than a volume of the first filler F1.

The radial width x2 of the applied second filler F2 is larger than a radial width x3 of the applied third filler F3. In one embodiment, the volume of the applied second filler F2 is larger than a volume of the applied third filler F3. If the volume of the third filler F3, which has a high chemical resistance to the processing liquid for use in the post-processing, is large, the third filler F3 cannot be easily removed from the laminated substrate Ws in a further later process. Thus, the third filler F3 is applied in a smaller volume than a volume of the second filler F2, so that the second filler F2 can be appropriately protected in the post-processing and the third filler F3 can be easily removed from the laminated substrate Ws.

The embodiment described with reference to FIGS. 9 to 11 is not particularly limited to the fillers having the above-described physical properties, as long as three different fillers are used. In one embodiment, the three fillers may be fillers which have different viscosities, a viscosity of the second filler F2 may be higher than a viscosity of the first filler F1, and a viscosity of the third filler F3 may be higher than a viscosity of the second filler F2. The viscosities of the first filler F1, the second filler F2, and the third filler F3 are each adjusted by a type of the binder, an amount of the solvent, an amount of the particles, diameters of the particles, etc.

Figure 12:
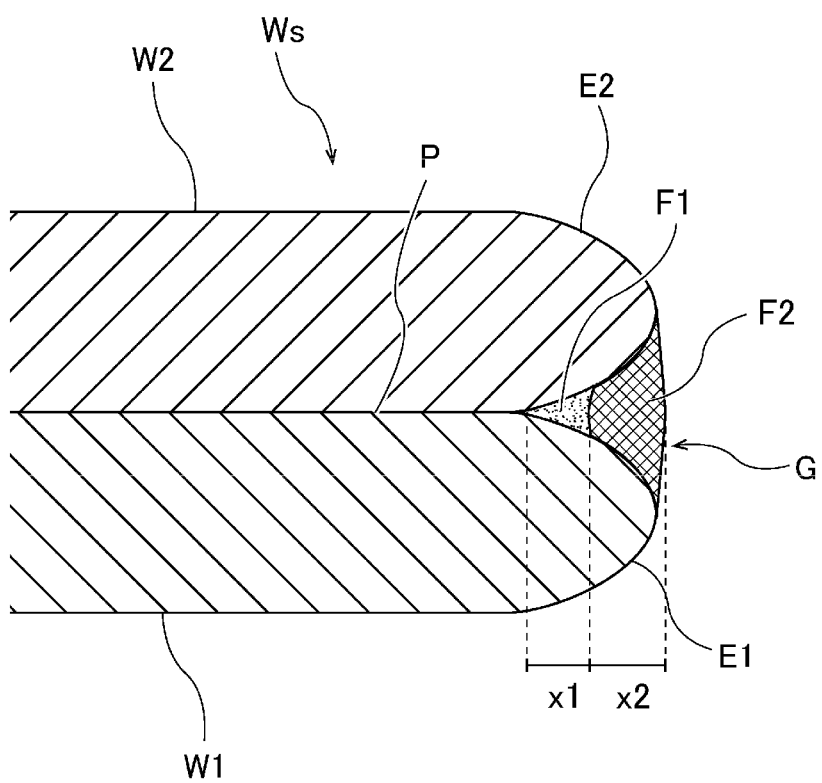
FIG. 12 is an enlarged cross-sectional view showing another embodiment of the edge portion of the laminated substrate filled with the first filler and the second filler.

FIG. 12 is an enlarged cross-sectional view showing another embodiment of the edge portion of the laminated substrate Ws filled with first filler F1 and second filler F2. In this embodiment, the third filler F3 having the chemical resistance described with reference to FIG. 11 is applied as the second filler F2. Configurations of the substrate processing apparatus 1 of this embodiment are the same as the configurations of the substrate processing apparatus 1 of the embodiment described with reference to FIGS. 4 and 5, and duplicated descriptions will be omitted.

The second filler F2 is located radially outwardly of the first filler F1, and is applied so as to cover the first filler F1. The first filler F1 and the second filler F2 are each composed of a binder, a solvent, and particles. The particles are dispersed in the binder dissolved in the solvent.

Examples of the binder include inorganic binder containing alkali metal silicate, organic binder made of silicone resin or epoxy resin, and the like. The binder may contain a solvent. An example of particles is inorganic particles, such as silica or alumina.

A thickness of the applied first filler F1 (a dimension along the thickness direction of the laminated substrate Ws) may be 10 μm or less. In one example, diameters of the particles contained in the first filler F1 are 1 μm or less. As a result, the first filler F1 fills even a region near the bonding surface P with no void.

The second filler F2 has chemical resistance that does not allow the second filler F2 to be dissolved by the processing liquid for use in the post-processing. Here, "not dissolved" not only mean that the second filler F2 is not dissolved at all, but also includes that the second filler F2 does not substantially collapse. When the filler is removed from the laminated substrate Ws in a further later process, the radial width x2 of the applied second filler F2 may be a width that does not hinder the removal of the second filler F2.

In one embodiment, the first filler F1 and/or the second filler F2 may not contain the particles.

Figure 13:
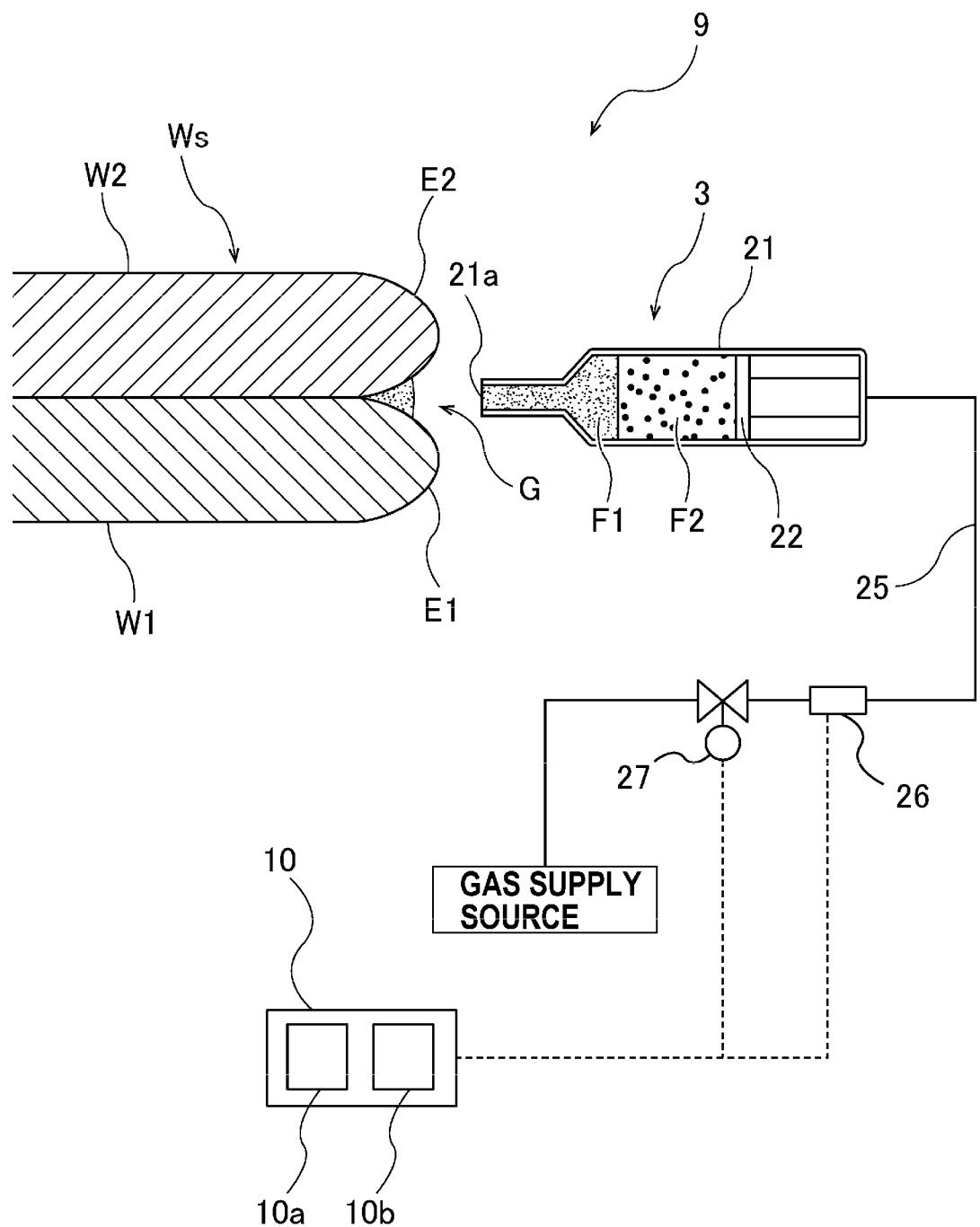
FIG. 13 is a schematic diagram showing another embodiment of a filler application module.

FIG. 13 is a schematic diagram showing another embodiment of the application device. In this embodiment, the filler application module 9 includes only one application device 3. A configuration of the filler application module 9, which will not be particularly described, is the same as the configuration of the first application device 3A described with reference to FIG. 6, and duplicated descriptions will be omitted.

The application device 3 is an application device configured to apply the first filler F1 and the second filler F2, as in the embodiment described with reference to FIG. 8. A syringe 21 of the application device 3 is filled with the first filler F1 and the second filler F2 therein in an order of the first filler F1 and the second filler F2 from a filler emitting port 21a.

The application device 3 is coupled to a gas supply source via a gas supply line 25. When gas (e.g., dry air or nitrogen gas) is supplied from the gas supply source into the syringe 21, a piston 22 moves forward in the syringe 21. The forward movement of the piston 22 causes the first filler F1 in the syringe 21 to be first emitted through the filler emitting port 21a. When the first filler F1 is completely emitted, the second filler F2 is then emitted from the filler emitting port 21a.

The application device 3 may be configured to apply the first filler F1, the second filler F2, and the third filler F3, as in the embodiment described with reference to FIG. 11. In this case, the syringe 21 of the application device 3 is filled with the first filler F1, the second filler F2, and the third filler F3 therein in an order of the first filler F1, the second filler F2, and the third filler F3 from closer to the filler emitting port 21a.

According to this embodiment, since the filler application module 9 includes only one application device 3, the device configurations are not complicated. In addition, the syringe 21 does not need to be replaced, and as a result, the number of steps can be reduced.

In still another embodiment of the filler application module 9, the first filler F1, the second filler F2, and the third filler F3 may be filled in different syringes 21, respectively. The filler to be applied may be changed by replacing the syringe 21 to be attached to the filler application module 9.

Figure 14:
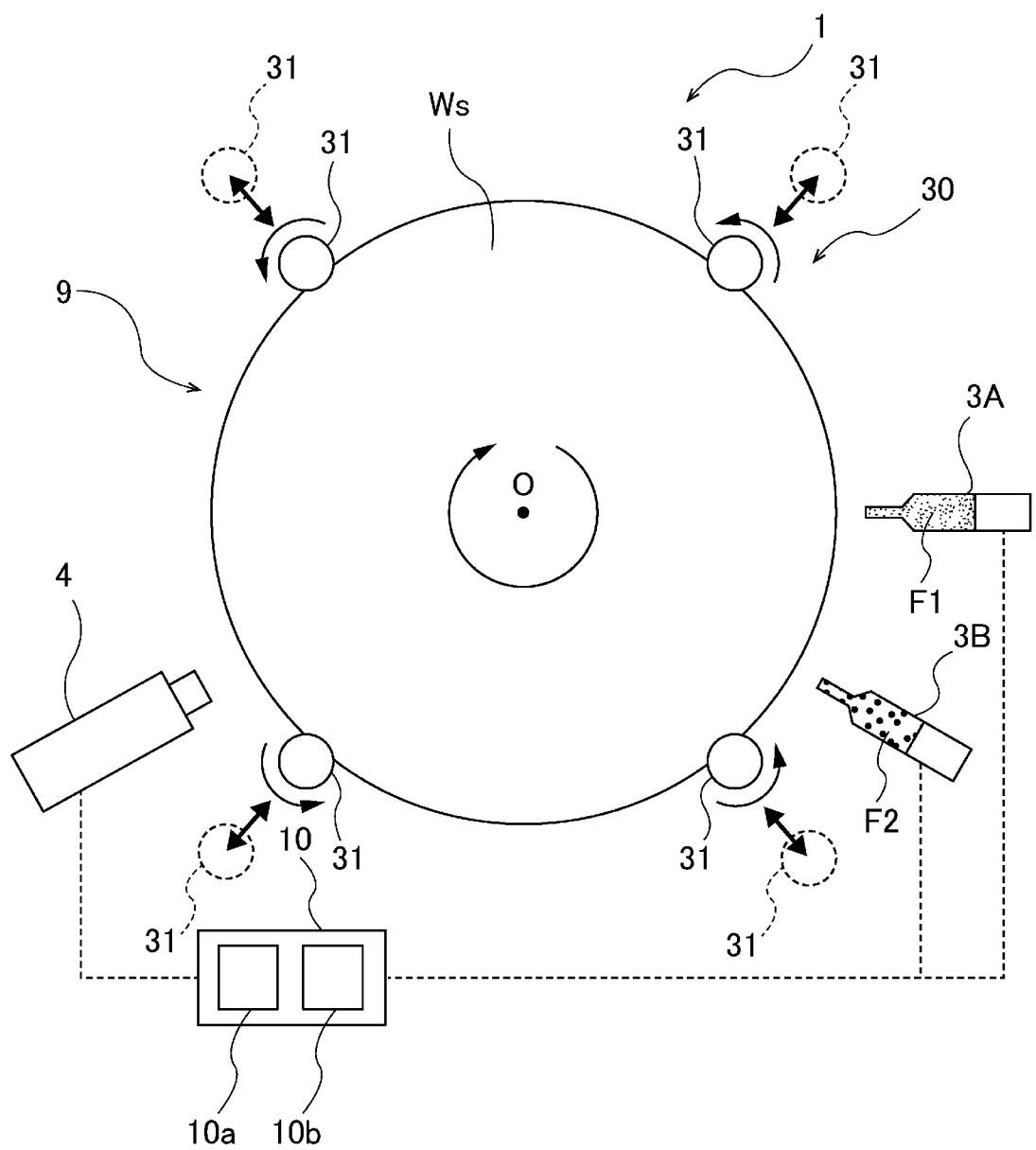
FIG. 14 is a plan view showing another embodiment of the substrate processing apparatus.
Figure 15:
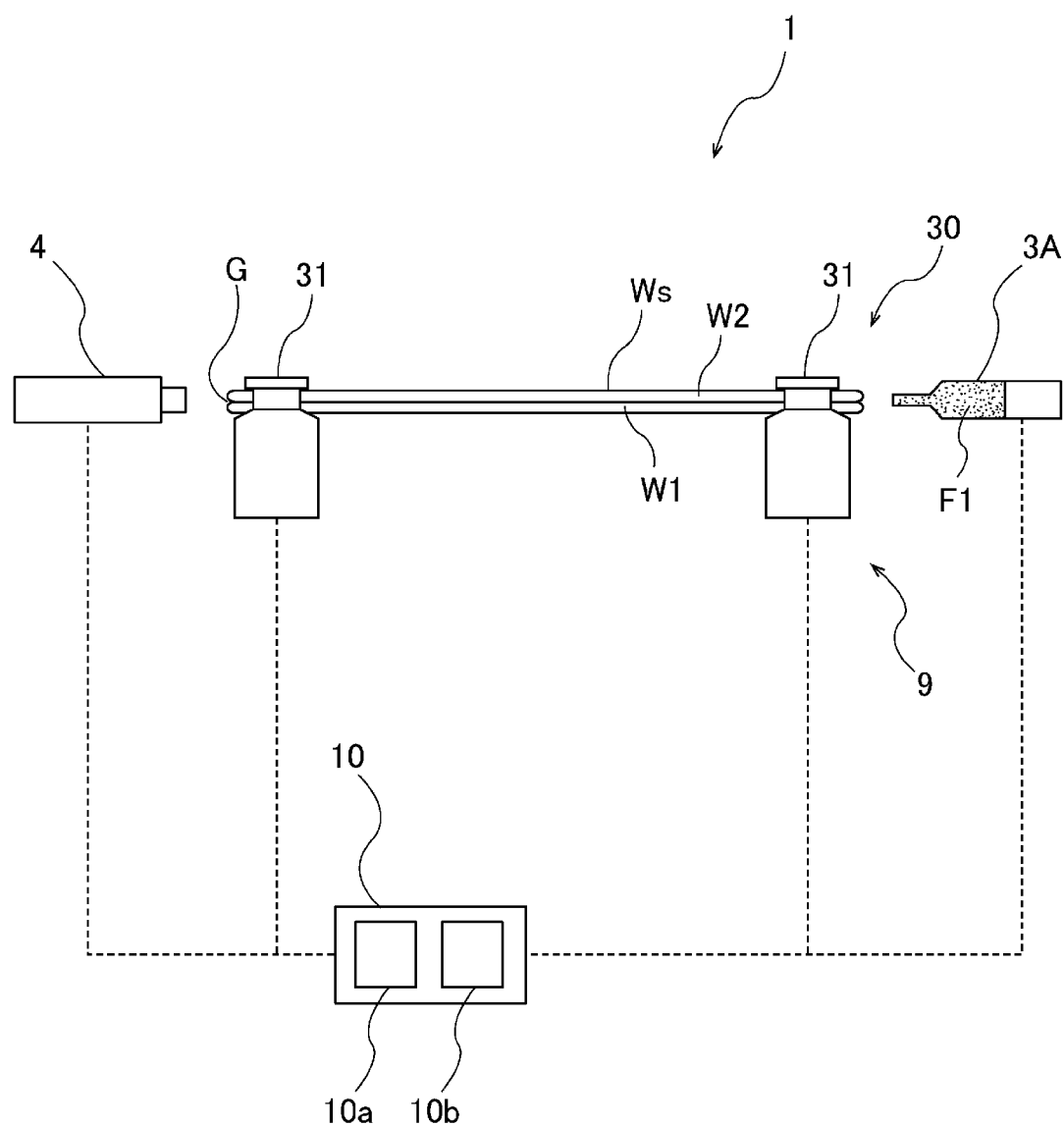
FIG. 15 is a side view of the substrate processing apparatus shown in FIG. 14.

FIG. 14 is a plan view showing another embodiment of the substrate processing apparatus 1. FIG. 15 is a side view of the substrate processing apparatus 1 shown in FIG. 14. Configurations of this embodiment, which will not be particularly described, are the same as the configurations of the embodiment described with reference to FIGS. 4 and 5, and duplicated descriptions will be omitted. In this embodiment, the filler application module 9 includes a substrate holding device 30, instead of the substrate holder 2, the rotating shaft 7, and the rotating mechanism 8.

The substrate holding device 30 includes three or more (in this embodiment, four) rollers 31 which can contact a periphery of the laminated substrate Ws, a roller rotating mechanism (not shown) configured to rotate the rollers 31 about their respective own axes, and a roller moving mechanism (not shown) configured to move the rollers 31. In this embodiment, the substrate holding device 30 includes the four rollers 31, while the substrate holding device 30 may include three, or five or more rollers.

The four rollers 31 are arranged around a reference center point O of the substrate holding device 30. Each of the rollers 31 is configured to contact the periphery of the laminated substrate Ws to hold the laminated substrate Ws horizontally. In other words, the laminated substrate Ws is held in a horizontal posture by the rollers 31 of the substrate holding device 30. As shown in FIG. 14, when the laminated substrate Ws is held in the horizontal posture by the rollers 31 of the substrate holding device 30, an upper surface and a lower surface of the laminated substrate Ws are each in an imaginary plane extending in a horizontal direction.

The roller rotating mechanism is coupled to the four rollers 31, and is configured to rotate the four rollers 31 in the same direction and at the same speed. The configuration of the roller rotating mechanism is not limited as long as three or more rollers 31 can be rotated in the same direction at the same speed, and any known rotating mechanism can be used as the roller rotating mechanism. An example of the roller rotating mechanism is a combination of a motor, pulleys (and/or gears), and a rotating belt.

The roller moving mechanism is coupled to the four rollers 31, and is configured to move each of the rollers 31 toward and away from the reference center point O of the substrate holding device 30. The roller moving mechanism moves the four rollers 31 between a holding position where the periphery of the laminated substrate Ws is held by the rollers 31 (see a solid line in FIG. 14) and a releasing position where the laminated substrate Ws is released from the rollers 31 (see a dotted line in FIG. 14).

The configuration of the roller moving mechanism is not limited as long as the four rollers 31 can be moved between the holding position and the releasing position, and any known moving mechanism can be used as the roller moving mechanism. Examples of the roller moving mechanism include a piston cylinder mechanism, and a combination of a ball screw and a motor (e.g., a stepping motor).

The roller rotating mechanism and the roller moving mechanism of the substrate holding device 30 are electrically coupled to the operation controller 10. The operation controller 10 is configured to be able to control operations of the roller rotating mechanism and the roller moving mechanism of the substrate holding device 30.

The laminated substrate Ws is transported by a not-shown transporting device to a position where the axis of the laminated substrate Ws is aligned with the reference center point O of the substrate holding device 30. At this time, the rollers 31 are located in the releasing position. Next, the four rollers 31 are moved to the holding position by the roller moving mechanism, so that the periphery of the laminated substrate Ws is held by the four rollers 31. With this operation, the laminated substrate Ws is held in the horizontal posture by the four rollers 31. The four rollers 31 that have been moved to the holding position are rotated by the roller rotating mechanism, so that the laminated substrate Ws is rotated about its own axis.

When the four rollers 31 are moved from the holding position to the releasing position by the roller moving mechanism, the four rollers 31 are separated from the periphery of the laminated substrate Ws, so that the laminated substrate Ws can be released from the four rollers 31. The released laminated substrate Ws is transported for next processing by a not-shown transporting device.

Application of the first filler F1 by the first application device 3A, application of the second filler F2 by the second application device 3B, and curing of the first filler F1 and the second filler F2 by the curing device 4 are performed while the laminated substrate Ws held in the horizontal posture is rotated by the substrate holding device 30.

In one embodiment, the roller rotating mechanism may be configured to rotate only some of the rollers 31. For example, the roller rotating mechanism may be coupled to two of the four rollers 31 and may be configured to rotate the two rollers 31 in the same direction and at the same speed. In this case, the other two rollers 31 are configured to rotate freely. When the four rollers 31 are located in the holding position, the two rollers 31 coupled to the roller rotating mechanism rotate to cause the other two rollers 31 to rotate following the two rollers 31 coupled to the roller rotating mechanism via the laminated substrate Ws.

In one embodiment, the roller moving mechanism may be configured to move only some of the rollers 31. For example, the roller moving mechanism may be coupled to two of the four rollers 31 and may be configured to move the two rollers 31 between the holding position and the releasing position. In this case, the other two rollers 31 are fixed in advance at the holding position. The laminated substrate Ws is transported by the transporting device to a position where the periphery of the laminated substrate Ws contacts the two rollers 31 fixed in position. The laminated substrate Ws can be held in the horizontal posture when the two rollers 31 coupled to the roller moving mechanism are moved to the holding position by the roller moving mechanism. The laminated substrate Ws can be released when the two rollers 31 coupled to the roller moving mechanism are moved to the releasing position by the roller moving mechanism.

In the embodiment described above, the substrate holder 2 and the rollers 31 of the substrate holding device 30 are configured to hold the laminated substrate Ws horizontally. In other words, the laminated substrate Ws is held in the horizontal posture by the substrate holder 2 or the rollers 31 of the substrate holding device 30. Application of the first filler F1 by the first application device 3A and application of the second filler F2 by the second application device 3B (and application of the third filler F3 by the third application device 3C) are performed while the laminated substrate Ws is rotated horizontally by the substrate holder 2 or the rollers 31 of the substrate holding device 30. However, the holding method for the laminated substrate Ws is not limited to the above-described embodiments as long as the first filler F1 and the second filler F2 (and the third filler F3) can be applied to the gap G. For example, the filler application module 9 may include a substrate holder or a substrate holding device configured to hold the laminated substrate Ws vertically. When the laminated substrate Ws is held in a vertical posture, an upper surface and a lower surface of the laminated substrate Ws are each in an imaginary plane extending in a vertical direction perpendicular to the horizontal direction.

Figure 16:
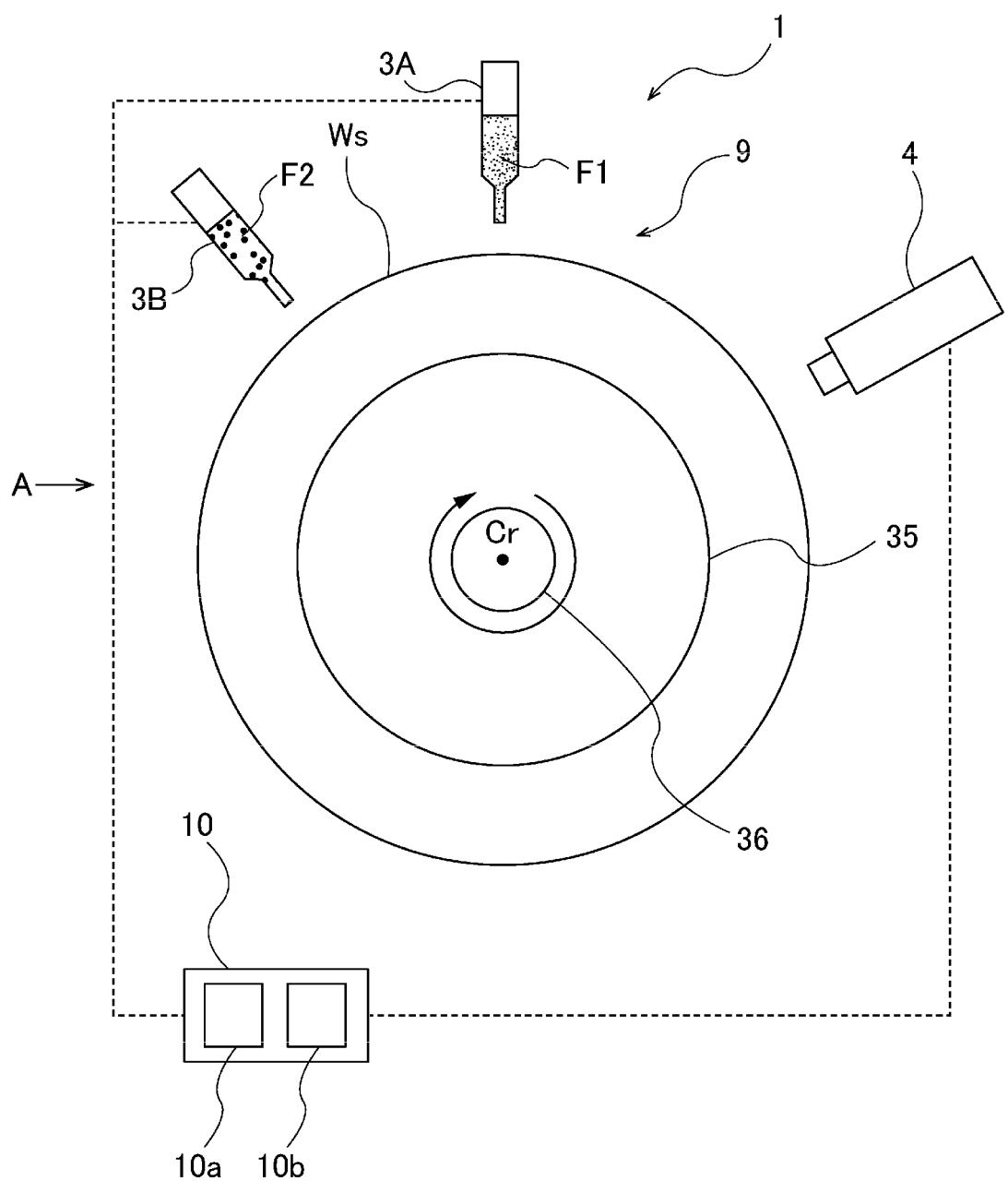
FIG. 16 is a side view showing still another embodiment of the substrate processing apparatus.
Figure 17:
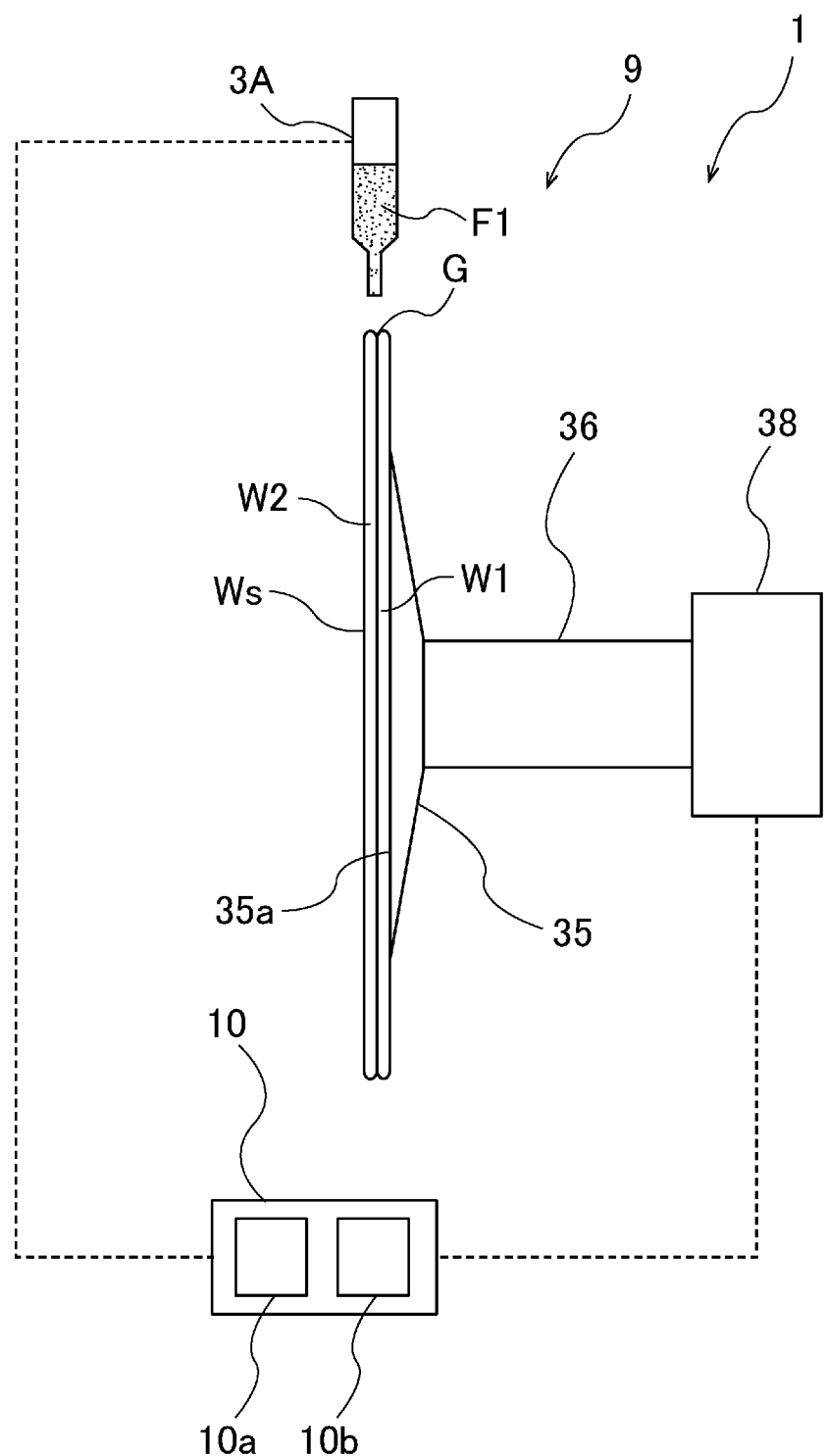
FIG. 17 is a diagram as viewed from a direction indicated by an arrow A in FIG. 16.

FIG. 16 is a side view showing still another embodiment of the substrate processing apparatus 1. FIG. 17 is a diagram as viewed from a direction indicated by an arrow A in FIG. 16. Configurations of this embodiment, which will not be particularly described, are the same as the configurations of the embodiment described with reference to FIGS. 4 and 5, and duplicated descriptions will be omitted. FIG. 16 is a diagram as viewed from a back side of the laminated substrate Ws. In this embodiment, the filler application module 9 includes a substrate holder 35, a rotating shaft 36, and a rotating mechanism 38, instead of the substrate holder 2, the rotating shaft 7, and the rotating mechanism 8.

The substrate holder 35 is configured to hold a back surface of the laminated substrate Ws by vacuum suction. As shown in FIG. 17, a holding surface 35a of the substrate holder 35 that holds the back surface of the laminated substrate Ws is perpendicular to a horizontal plane. The laminated substrate Ws is held perpendicularly to the horizontal plane. In other words, the laminated substrate Ws is held in a vertical posture by the substrate holder 35.

The rotating shaft 36 is coupled to a center portion of the substrate holder 35. The laminated substrate Ws is held by the substrate holder 35 such that the center of the laminated substrate Ws is aligned with a central axis of the rotating shaft 36. The rotating mechanism 38 includes a motor (not shown). As shown in FIG. 16, the rotating mechanism 38 is configured to rotate the substrate holder 35 and the laminated substrate Ws together in a direction shown by an arrow about a central axis Cr of the laminated substrate Ws.

The filler application module 9 includes a first application-device moving mechanism (not shown) configured to move the first application device 3A, and a second application-device moving mechanism (not shown) configured to move the second application device 3B. The first application-device moving mechanism and the second application-device moving mechanism are coupled to the first application device 3A and the second application device 3B, respectively. The first application-device moving mechanism and the second application-device moving mechanism are configured to move the first application device 3A and the second application device 3B between applying positions where the fillers are applied and standby positions where application of the fillers are prohibited, respectively. For example, the standby positions of the first application device 3A and the second application device 3B are set more distant from the laminated substrate Ws than the applying positions, respectively, so as not to interfere with operations of other device, such as transporting of the laminated substrate Ws.

In this embodiment, the applying positions of the first application device 3A and the second application device 3B are positions where the first application device 3A and the second application device 3B are located above the laminated substrate Ws held by the substrate holder 35 and are facing the gap G of the laminated substrates Ws, respectively. When the first application device 3A or the second application device 3B located in the applying position emits the filler, the filler drops toward the gap G of the laminated substrate Ws, and as a result, the filler can be applied to the gap G of the laminated substrate Ws. In this embodiment, the standby positions are set more distant from the laminated substrate Ws than the applying positions, respectively. In FIGS. 16 and 17, the first application device 3A is arranged in the applying position.

The substrate holder 35, the rotating mechanism 38, the first application-device moving mechanism, and the second application-device moving mechanism are electrically coupled to the operation controller 10. Operations of the substrate holder 35, the rotating mechanism 38, the first application-device moving mechanism, and the second application-device moving mechanism are controlled by the operation controller 10.

When the first filler F1 is to be applied to the laminated substrate Ws by the first application device 3A, the first application-device moving mechanism moves the first application device 3A to the applying position. While the first application device 3A applies the first filler F1 to the laminated substrate Ws, the second application device 3B is arranged in the standby position. The first application-device moving mechanism may be configured to be able to adjust a distance between the first application device 3A and the laminated substrate Ws. For example, the operation controller 10 may instruct the first application-device moving mechanism to adjust the distance between the first application device 3A and the laminated substrate Ws such that the first filler F1 is appropriately injected into the gap G of the laminated substrate Ws according to a physical property, such as a viscosity of the first filler F1.

When the second application device 3B is to apply the second filler F2 to the laminated substrate Ws after the application of the first filler F1 by the first application device 3A, the first application-device moving mechanism moves the first application device 3A to the standby position, and the second application-device moving mechanism moves the second application device 3B to the applying position. The second application-device moving mechanism may be configured to be able to adjust a distance between the second application device 3B and the laminated substrate Ws. For example, the operation controller 10 may instruct the second application-device moving mechanism to adjust the distance between the second application device 3B and the laminated substrate Ws such that the second filler F2 is appropriately injected into the gap G of the laminated substrate Ws according to a physical property, such as a viscosity of the second filler F2.

Application of the first filler F1 by the first application device 3A, application of the second filler F2 by the second application device 3B, and curing of the first filler F1 and the second filler F2 by the curing device 4 are performed while the laminated substrate Ws held in the vertical posture is rotated by the substrate holder 35.

In one embodiment, the filler application module 9 may not include the first application-device moving mechanism and the second application-device moving mechanism, and the first application device 3A and the second application device 3B may be arranged side by side above the laminated substrate Ws held by the substrate holder 35. In this case, the distance between the first application device 3A and the laminated substrate Ws and the distance between the second application device 3B and the laminated substrate Ws are determined in advance such that the first filler F1 and the second filler F2 are appropriately injected into the gap G of the laminated substrate Ws.

As shown in FIG. 16, the curing device 4 is located radially outwardly of the laminated substrate Ws held by the substrate holder 35. The curing device 4 is disposed downstream of the applying positions of the first application device 3A and the second application device 3B in the rotating direction of the laminated substrate Ws, and is configured to cure the first filler F1 and the second filler F2 that have been applied to the laminated substrate Ws by the first application device 3A and the second application device 3B.

Figure 18:
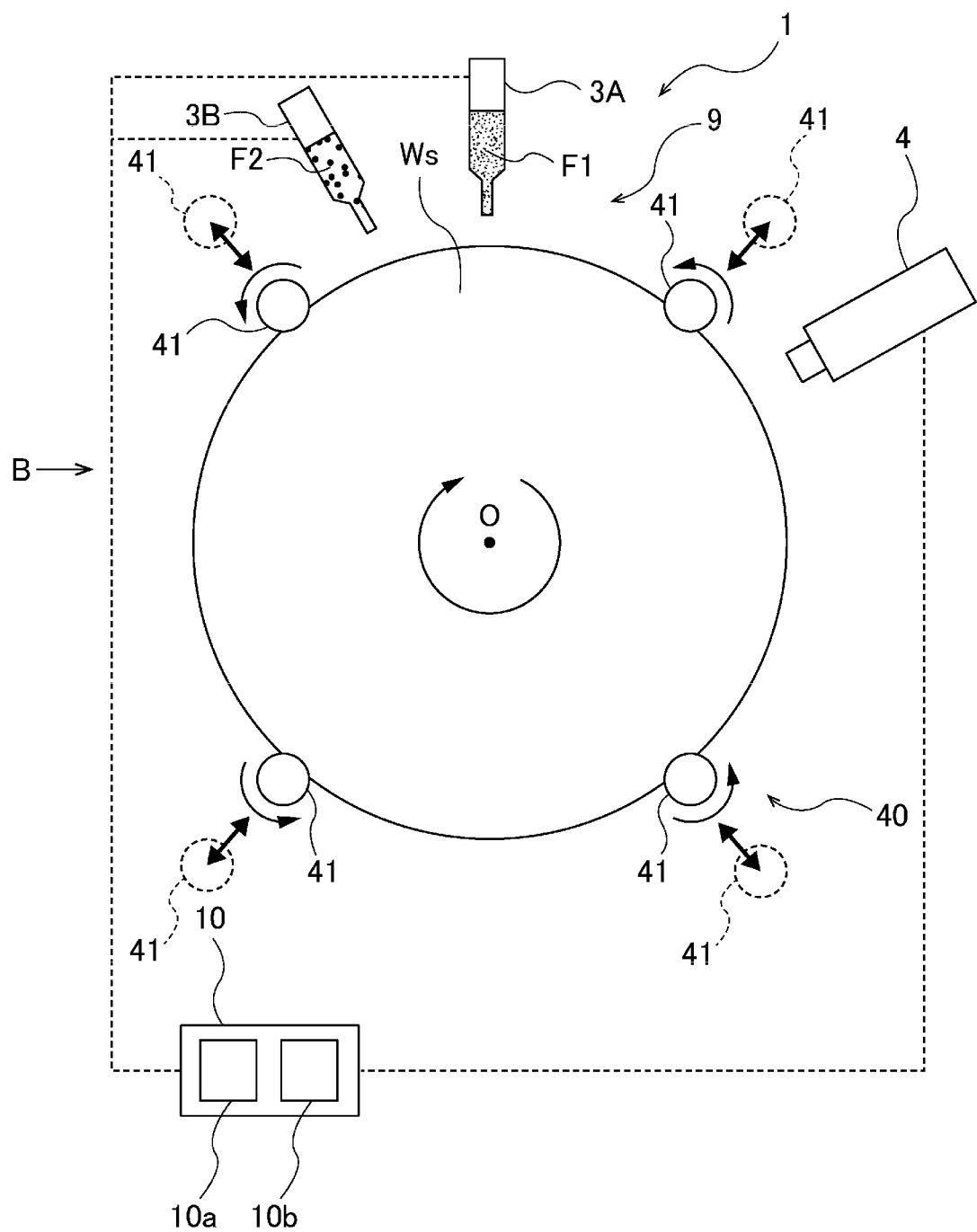
FIG. 18 is a side view showing still another embodiment of the substrate processing apparatus.
Figure 19:
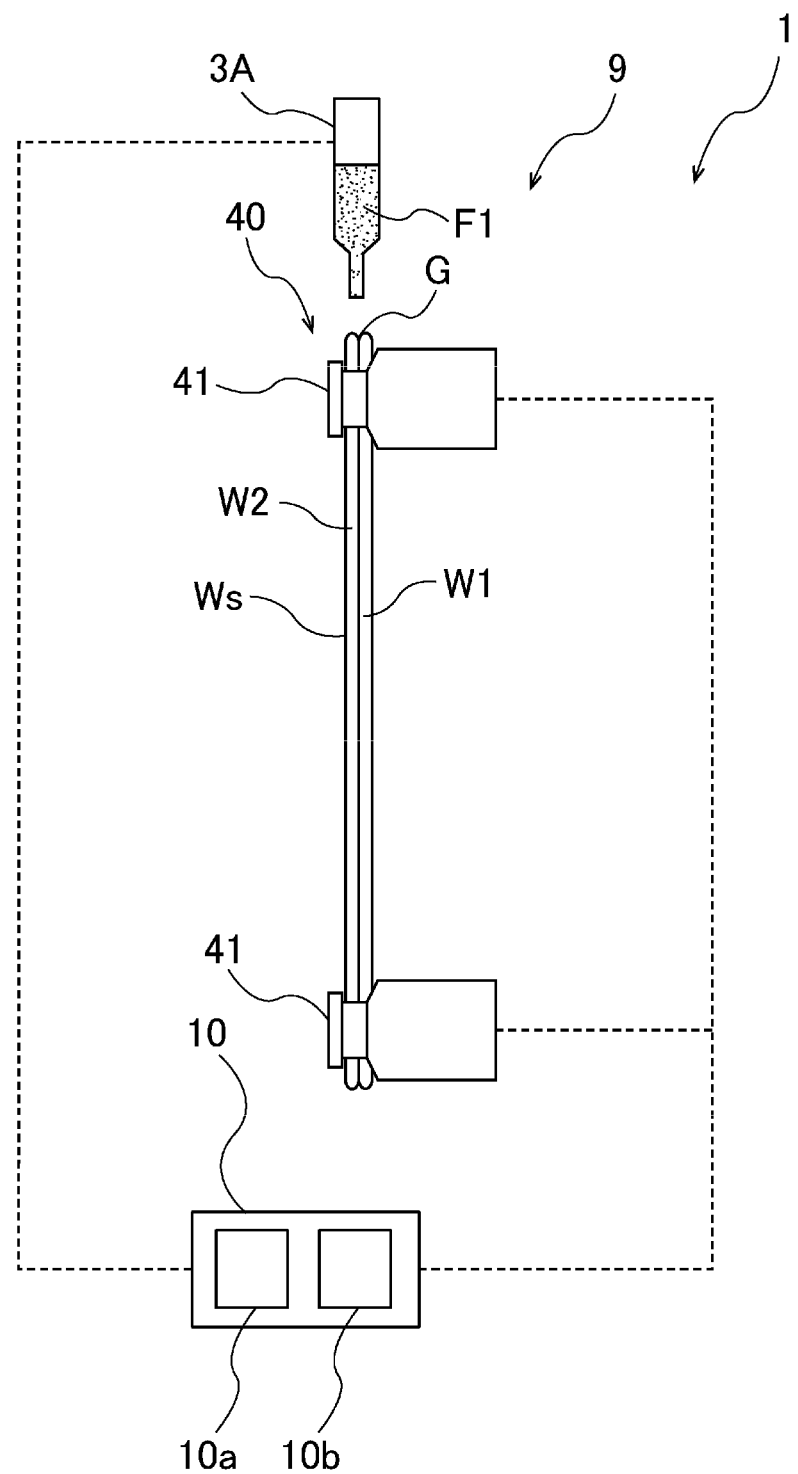
FIG. 19 is a diagram as viewed from a direction indicated by an arrow B in FIG. 18.

FIG. 18 is a side view showing still another embodiment of the substrate processing apparatus 1. FIG. 19 is a diagram as viewed from a direction indicated by an arrow B in FIG. 18. Configurations of this embodiment, which will not be particularly described, are the same as the configurations of the embodiment described with reference to FIGS. 16 and 17, and duplicated descriptions will be omitted. In this embodiment, the filler application module 9 includes a substrate holding device 40, instead of the substrate holder 35, the rotating shaft 36, and the rotating mechanism 38.

The substrate holding device 40 includes three or more (in this embodiment, four) rollers 41 which can contact the periphery of the laminated substrate Ws, a roller rotating mechanism (not shown) configured to rotate the rollers 41 about their respective own axis, and a roller moving mechanism (not shown) configured to move the rollers 41. In this embodiment, the substrate holding device 40 includes the four rollers 41, while the substrate holding device 40 may include three, or five or more rollers.

The four rollers 41 are arranged around a reference center point O of the substrate holding device 40. Each of the rollers 41 is configured to contact the periphery of the laminated substrate Ws to hold the laminated substrate Ws vertically. In other words, the laminated substrate Ws is held in a vertical posture by the rollers 41 of the substrate holding device 40. As shown in FIG. 18, when the laminated substrate Ws is held in the vertical posture by the rollers 41 of the substrate holding device 40, an upper surface and a lower surface of the laminated substrate Ws are each in an imaginary plane extending in a vertical direction.

The roller rotating mechanism is coupled to the four rollers 41, and is configured to rotate the four rollers 41 in the same direction and at the same speed. The configuration of the roller rotating mechanism is not limited as long as three or more rollers 41 can be rotated in the same direction at the same speed, and any known rotating mechanism can be used as the roller rotating mechanism. An example of the roller rotating mechanism is a combination of a motor, pulleys (and/or gears), and a rotating belt.

The roller moving mechanism is coupled to the four rollers 41, and is configured to move each of the rollers 41 toward and away from the reference center point O of the substrate holding device 40. The roller moving mechanism moves the four rollers 41 between a holding position where the periphery of the laminated substrate Ws is held by the rollers 41 (see a solid line in FIG. 18) and a releasing position where the laminated substrate Ws is released from the rollers 41 (see a dotted line in FIG. 18). The configuration of the roller moving mechanism is not limited as long as the four rollers 41 can be moved between the holding position and the releasing position, and any known moving mechanism can be used as the roller moving mechanism. Examples of the roller moving mechanism include a piston cylinder mechanism, and a combination of a ball screw and a motor (e.g., a stepping motor).

The roller rotating mechanism and the roller moving mechanism of the substrate holding device 40 are electrically coupled to the operation controller 10, and operations of the roller rotating mechanism and the roller moving mechanism of the substrate holding device 40 are controlled by the operation controller 10.

The laminated substrate Ws is transported by a not-shown transporting device to a position where the axis of the laminated substrate Ws is aligned with the reference center point O of the substrate holding device 40. At this time, the rollers 41 are located in the releasing position. Next, the four rollers 41 are moved to the holding position by the roller moving mechanism, so that the periphery of the laminated substrate Ws is held by the four rollers 41. With this operation, the laminated substrate Ws is held in the vertical posture by the four rollers 41. The four rollers 41 that have been moved to the holding position are rotated by the roller rotating mechanism, so that the laminated substrate Ws is rotated about its own axis.

When the four rollers 41 are moved from the holding position to the releasing position by the roller moving mechanism, the four rollers 41 are separated from the periphery of the laminated substrate Ws, so that the laminated substrate Ws can be released from the four rollers 41. The released laminated substrate Ws is transported for next processing by a not-shown transporting device.

Application of the first filler F1 by the first application device 3A, application of the second filler F2 by the second application device 3B, and curing of the first filler F1 and the second filler F2 by the curing device 4 are performed while the laminated substrate Ws held in the vertical posture is rotated by the substrate holding device 40.

In one embodiment, the roller rotating mechanism may be configured to rotate only some of the rollers 41. For example, the roller rotating mechanism may be coupled to two of the four rollers 41 and may be configured to rotate the two rollers in the same direction and at the same speed. In this case, the other two rollers 41 are configured to rotate freely. When the four rollers 41 are located in the holding position, the two rollers 41 coupled to the roller rotating mechanism rotate to cause the other two rollers 41 to rotate following the two rollers 41 coupled to the roller rotating mechanism via the laminated substrate Ws.

In one embodiment, the roller moving mechanism may be configured to move only some of the rollers 41. For example, the roller moving mechanism may be coupled to two of the four rollers 41 and may be configured to move the two rollers 41 between the holding position and the releasing position. In this case, the other two rollers 41 are fixed in advance at the holding position. The laminated substrate Ws is transported by the transporting device to a position where the periphery of the laminated substrate Ws contacts the two rollers 41 fixed in position. The laminated substrate Ws can be held in the vertical posture when the two rollers 41 coupled to the roller moving mechanism are moved to the holding position by the roller moving mechanism. The laminated substrate Ws can be released when the two rollers 41 coupled to the roller moving mechanism are moved to the releasing position by the roller moving mechanism.

Each of the embodiments described with reference to FIGS. 14 to 19 may be applied to each of the embodiments described with reference to FIGS. 9 and 13. For example, the embodiment described with reference to FIGS. 16 and 17 may be applied to the embodiment described with reference to FIG. 9, so that application of the first filler F1 by the first application device 3A, application of the second filler F2 by the second application device 3B, application of the third filler F3 by the third filling device 3C, and curing of the first filler F1, the second filler F2, and the third filler F3 by the curing device 4 may be performed while the laminated substrate Ws held in the vertically posture is rotated by the substrate holder 35.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

INDUSTRIAL APPLICABILITY

The present invention is applicable to a substrate processing method of suppressing cracking and chipping of a laminated substrate manufactured by bonding substrates, and more particularly to a technique of applying filler to a gap formed between edge portions of the substrates constituting the laminated substrate.

REFERENCE SIGNS LIST 1 substrate processing apparatus
2 substrate holder
3 application device
3A first application device
3B second application device
3C third application device
4 curing device
7 rotating shaft
8 rotating mechanism
9 filler application module
10 operation controller
10a memory
10b processor
21 syringe
21a filler emitting port
22 piston
25 gas supply line
26 pressure regulator
27 on-off valve
30 substrate holding device
31 roller
35 substrate holder
36 rotating shaft
38 rotating mechanism
40 substrate holding device
41 roller

What is claimed is:

1. A substrate processing method of applying a filler to a laminated substrate having a first substrate and a second substrate bonded to each other, comprising:
applying a first filler to a gap between a bevel portion of the bonded first substrate constituting the laminated substrate and a bevel portion of the bonded second substrate constituting the laminated substrate; and
applying a second filler to the gap after applying of the first filler to fill the gap with the first filler and the second filler, a viscosity of the first filler being lower than a viscosity of the second filler.

2. The substrate processing method according to claim 1, further comprising curing the first filler after applying of the first filler,
wherein applying of the second filler is performed after curing of the first filler.

3. The substrate processing method according to claim 1, wherein the first filler contains particles, and a diameter of each of the particles is 1 μm or less.

4. The substrate processing method according to claim 3, wherein the second filler contains particles, and a diameter of each of the particles contained in the second filler is larger than the diameter of each of the particles contained in the first filler.

5. The substrate processing method according to claim 1, wherein the first filler does not contain particles.

6. The substrate processing method according to claim 1, wherein the viscosity of the first filler is 5 Pa·s or less.

7. The substrate processing method according to claim 1, wherein a radial width of the applied first filler is smaller than a radial width of the applied second filler.

8. A substrate processing method of applying a filler to a laminated substrate having a first substrate and a second substrate bonded to each other, comprising:
applying a first filler to a gap between an edge portion of the bonded first substrate constituting the laminated substrate and an edge portion of the bonded second substrate constituting the laminated substrate;
applying a second filler to the gap after applying of the first filler, a viscosity of the first filler being lower than a viscosity of the second filler;
applying a third filler to the gap after applying of the second filler; and
post-processing for the laminated substrate after applying of the third filler,
wherein the third filler has chemical resistance that does not allow the third filler to be dissolved by a processing liquid for use in the post-processing.

9. A substrate processing method of applying a filler to a laminated substrate having a first substrate and a second substrate bonded to each other, comprising:
applying a first filler to a gap between an edge portion of the bonded first substrate constituting the laminated substrate and an edge portion of the bonded second substrate constituting the laminated substrate;
applying a second filler to the gap after applying of the first filler, a viscosity of the first filler being lower than a viscosity of the second filler; and
applying a third filler to the gap after applying of the second filler, a viscosity of the third filler being higher than the viscosity of the second filler.

10. The substrate processing method according to claim 8, further comprising curing the second filler after applying of the second filler,
wherein applying of the third filler is performed after curing of the second filler.

11. The substrate processing method according to claim 8, wherein a radial width of the applied second filler is larger than a radial width of the applied third filler.

12. A substrate processing method of applying a filler to a laminated substrate having a first substrate and a second substrate bonded to each other, comprising:
applying a first filler to a gap between an edge portion of the bonded first substrate constituting the laminated substrate and an edge portion of the bonded second substrate constituting the laminated substrate;
applying a second filler to the gap after applying of the first filler; and
post-processing for the laminated substrate after applying of the second filler,
wherein the second filler has chemical resistance that does not allow the second filler to be dissolved by a processing liquid for use in the post-processing.

13. The substrate processing method according to claim 12, further comprising curing the first filler after applying of the first filler,
   wherein applying of the second filler is performed after curing of the first filler.

14. The substrate processing method according to claim 12, wherein the first filler contains particles, and a diameter of each of the particles is 1 µm or less.

15. The substrate processing method according to claim 12, wherein the first filler does not contain particles.

16. The substrate processing method according to claim 1, wherein applying of the first filler and applying of the second filler are performed while the laminated substrate held in a vertical posture is rotated.

17. The substrate processing method according to claim 8, wherein applying of the third filler is performed while the laminated substrate held in a vertical posture is rotated.

18. The substrate processing method according to claim 12, wherein applying of the first filler and applying of the second filler are performed while the laminated substrate held in a vertical posture is rotated.

* * * * *